(12) United States Patent
Shim et al.

(10) Patent No.: US 11,022,804 B2
(45) Date of Patent: Jun. 1, 2021

(54) HEAD-MOUNTED DISPLAY AND METHOD OF CONTROLLING THE SAME

(71) Applicant: LG ELECTRONICS INC., Seoul (KR)

(72) Inventors: Hongjo Shim, Seoul (KR); Mihyun Park, Seoul (KR); Hyunok Lee, Seoul (KR); Youngho Sohn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/629,217

(22) PCT Filed: Jul. 20, 2017

(86) PCT No.: PCT/KR2017/007849
§ 371 (c)(1),
(2) Date: Jan. 7, 2020

(87) PCT Pub. No.: WO2019/017513
PCT Pub. Date: Jan. 24, 2019

(65) Prior Publication Data
US 2020/0225474 A1    Jul. 16, 2020

(51) Int. Cl.
*G02B 27/01* (2006.01)
*F21V 8/00* (2006.01)
(Continued)

(52) U.S. Cl.
CPC ....... *G02B 27/0172* (2013.01); *G02B 6/0045* (2013.01); *G02B 6/0068* (2013.01);
(Continued)

(58) Field of Classification Search
CPC ........ G02B 3/14; G02B 3/12; G02B 27/0101; G02B 27/01; G02B 27/0093; G02B 27/0172; G02B 26/0833; G02B 26/005; G02B 2027/0181; G02B 2027/0134; G02B 2027/014; G02B 2027/0138; G02B 6/0076; G02B 6/0045; G02B 6/0068; G02B 2027/0178; G06F 1/163; G06F 3/011; G06F 3/017; G02F 1/137; G02F 1/133528;
(Continued)

(56) References Cited

U.S. PATENT DOCUMENTS 6,185,045 B1 * 2/2001 Hanano ............... G02B 27/0172
359/630
10,656,720 B1 * 5/2020 Holz ....................... G06F 3/017
(Continued)

FOREIGN PATENT DOCUMENTS

KR    10-2017-0073273 A    6/2017

*Primary Examiner* — Christopher E Leiby
(74) *Attorney, Agent, or Firm* — Birch, Stewart, Kolasch & Birch, LLP

(57) ABSTRACT

A head-mounted display (HMD) includes a frame configured to be fixated to a head, a light-transmissive display unit fixated to the frame and outputting a VR image in a VR mode and an AR image in an AR mode, a light transmission control layer having changed transmittance, a lens unit having a refractive index changed in the VR mode and the AR mode, and a controller control the light transmission control layer to increase transmittance in the AR mode and decrease transmittance in the VR mode.

16 Claims, 22 Drawing Sheets

(51) Int. Cl.
*G02F 1/1334* (2006.01)
*G02F 1/1335* (2006.01)
*G02F 1/137* (2006.01)
*G02F 1/29* (2006.01)
*G06F 3/01* (2006.01)

(52) U.S. Cl.
CPC ........... *G02B 6/0076* (2013.01); *G02F 1/137* (2013.01); *G02F 1/1334* (2013.01); *G02F 1/133528* (2013.01); *G02F 1/29* (2013.01); *G06F 3/011* (2013.01); *G06F 3/017* (2013.01); *G02B 2027/0138* (2013.01); *G02B 2027/0178* (2013.01); *G02F 1/294* (2021.01)

(58) Field of Classification Search
CPC .... G02F 1/1334; G02F 1/29; G02F 1/133615; G02F 1/1362; G02F 2001/294
See application file for complete search history.

(56) References Cited

U.S. PATENT DOCUMENTS

| | | | |
|---|---|---|---|
| 2010/0295987 A1* | 11/2010 | Berge | H04N 5/23212 348/360 |
| 2011/0063542 A1* | 3/2011 | Park | G02B 6/0036 349/62 |
| 2012/0050143 A1 | 3/2012 | Border et al. | |
| 2012/0068913 A1 | 3/2012 | Bar-Zeev et al. | |
| 2015/0009101 A1* | 1/2015 | Biwa | G02B 27/017 345/8 |
| 2015/0212326 A1 | 7/2015 | Kress et al. | |
| 2016/0025978 A1 | 1/2016 | Mallinson | |
| 2016/0320625 A1* | 11/2016 | von und zu Liechtenstein | H04N 13/00 |
| 2018/0004013 A1* | 1/2018 | Vasiliev | G02C 7/101 |
| 2018/0276475 A1* | 9/2018 | Podradchik | G08G 5/0078 |
| 2019/0094577 A1* | 3/2019 | Fan | G02F 1/133514 |

* cited by examiner

[Fig. 1A]
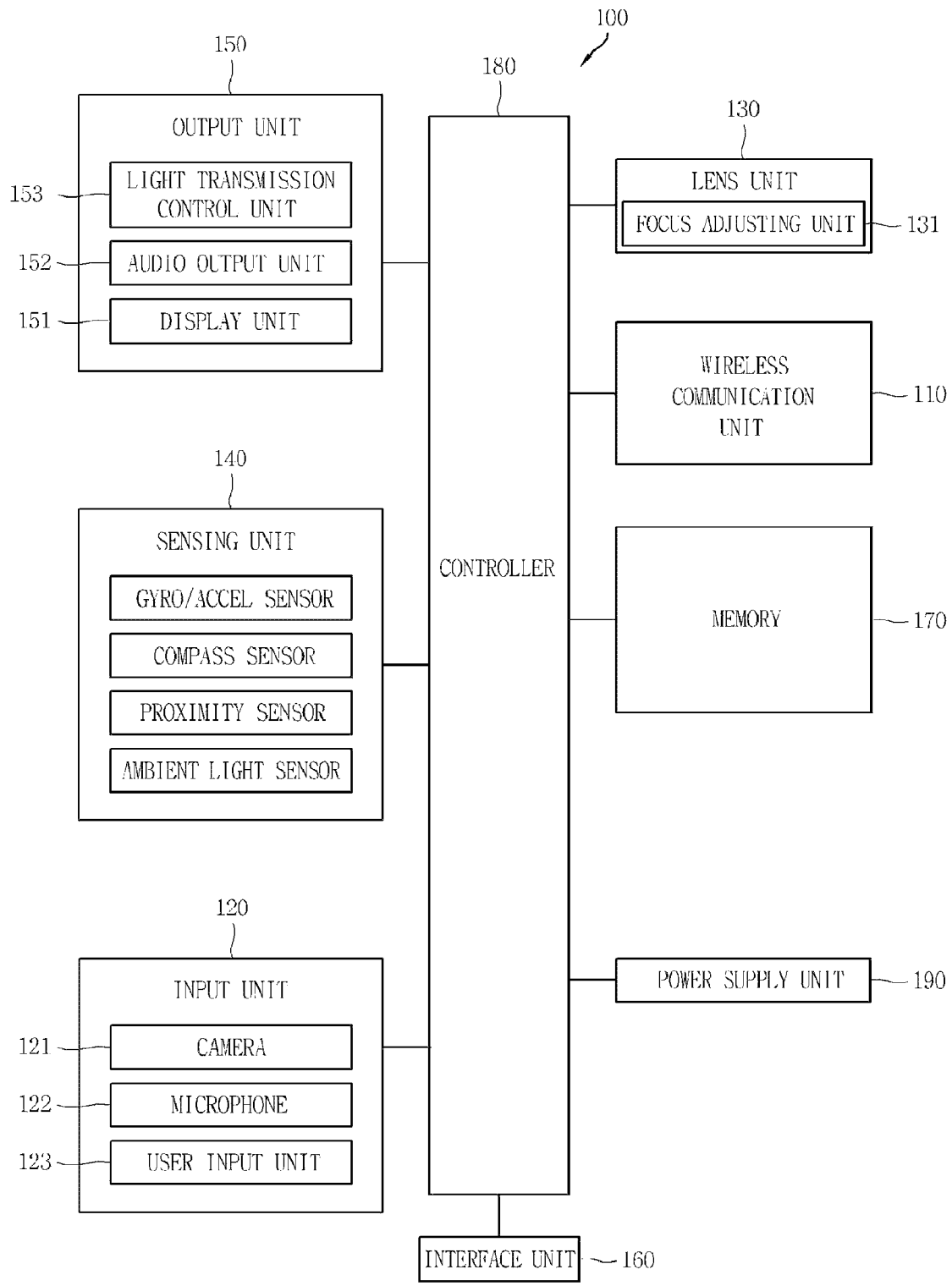

[Fig. 1B]
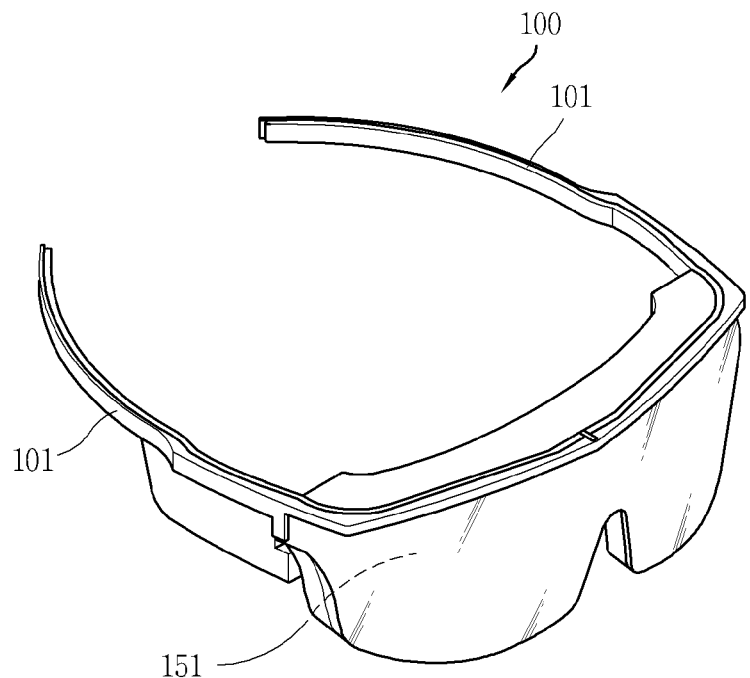
[Fig. 1C]
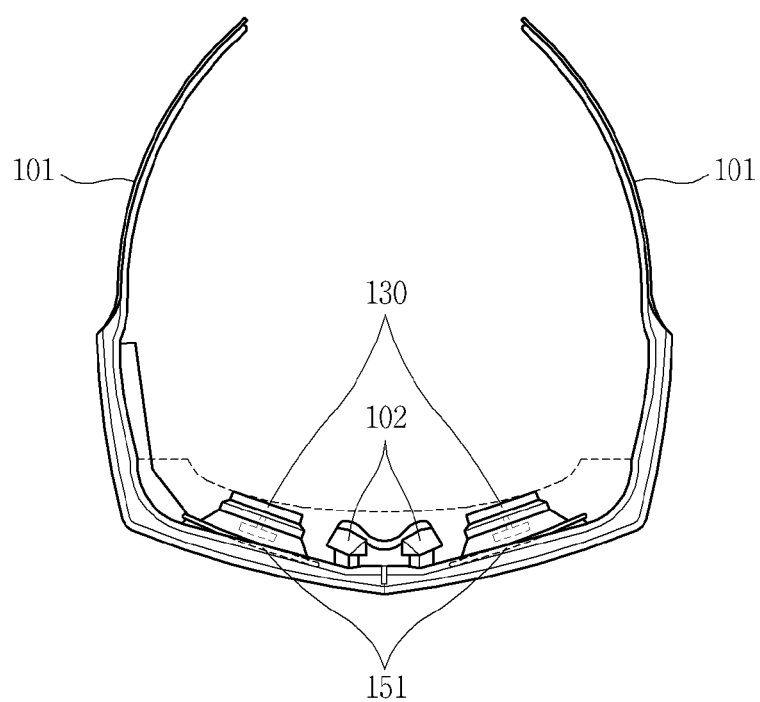

[Fig. 2]
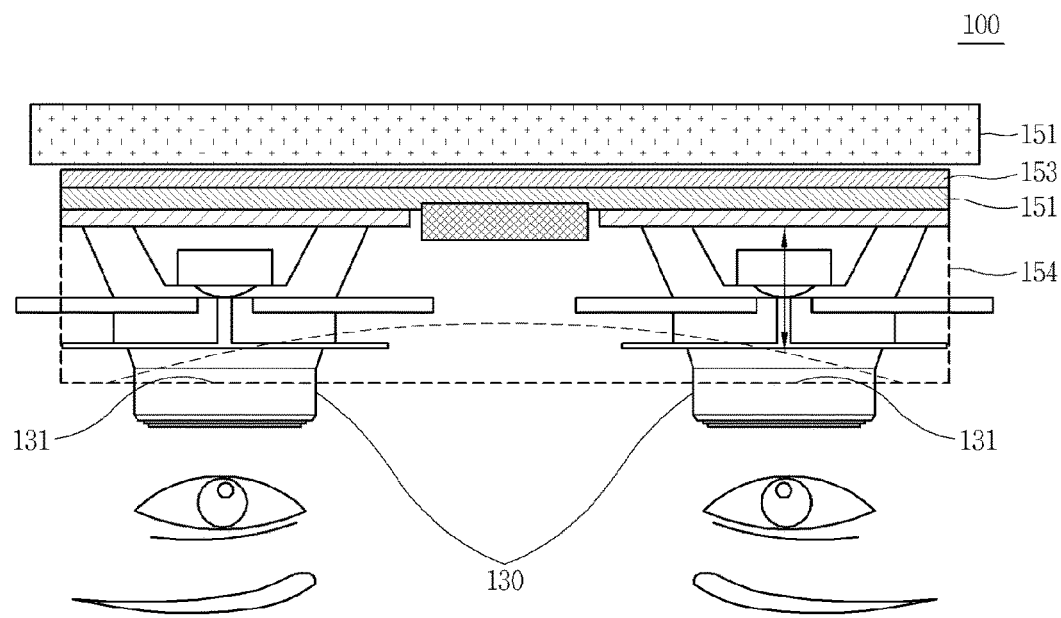
[Fig. 3A]
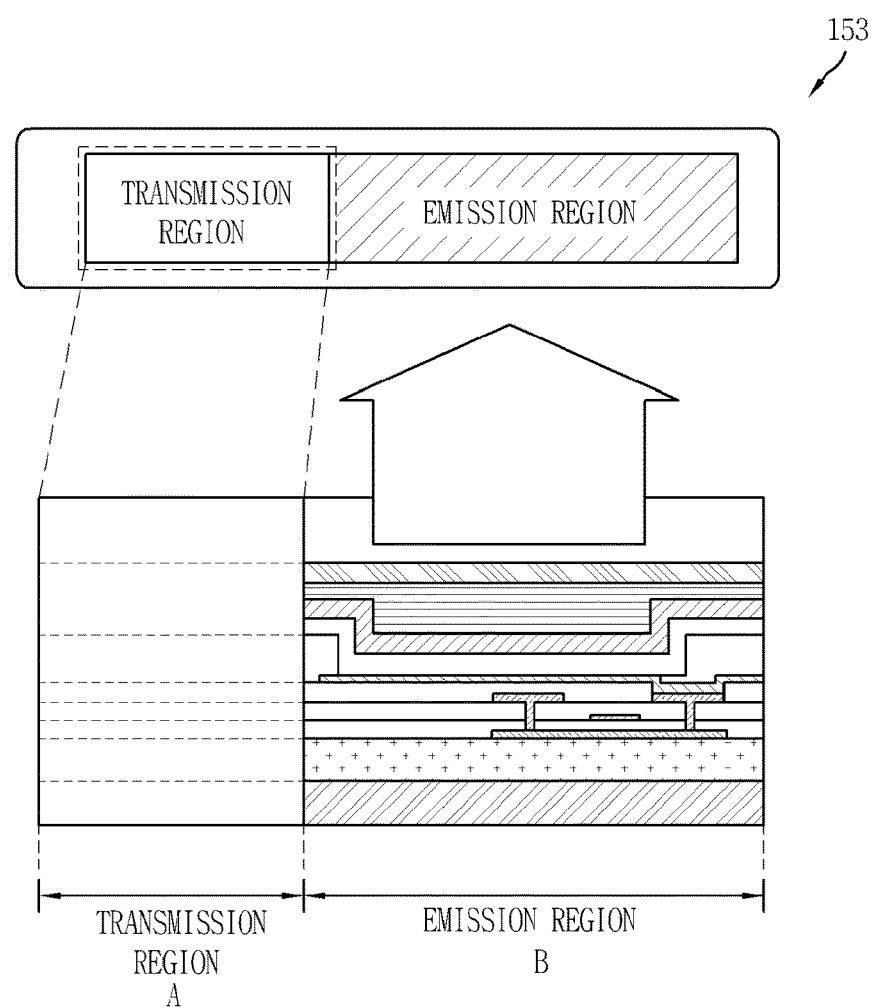

[Fig. 3B]
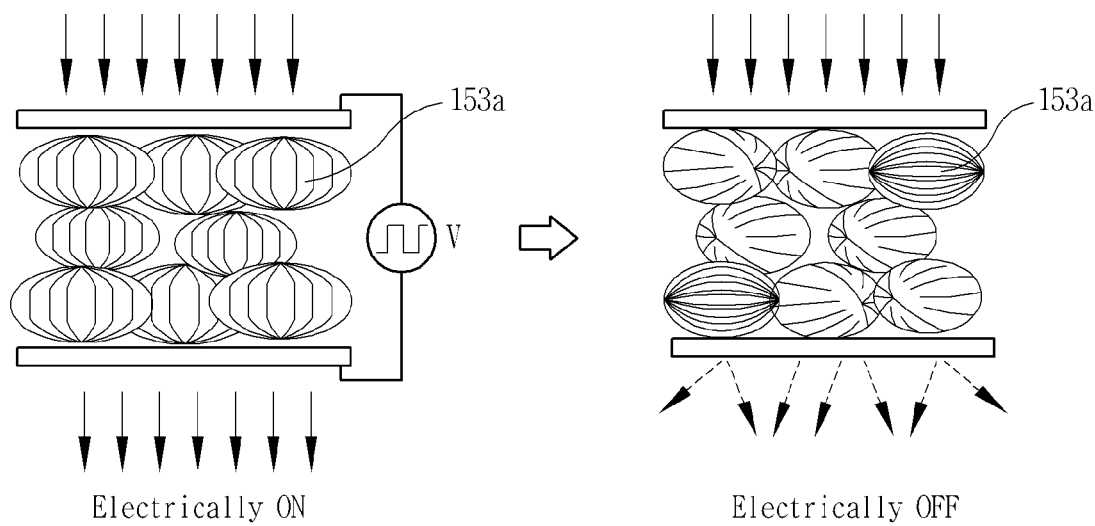

[Fig. 3C]
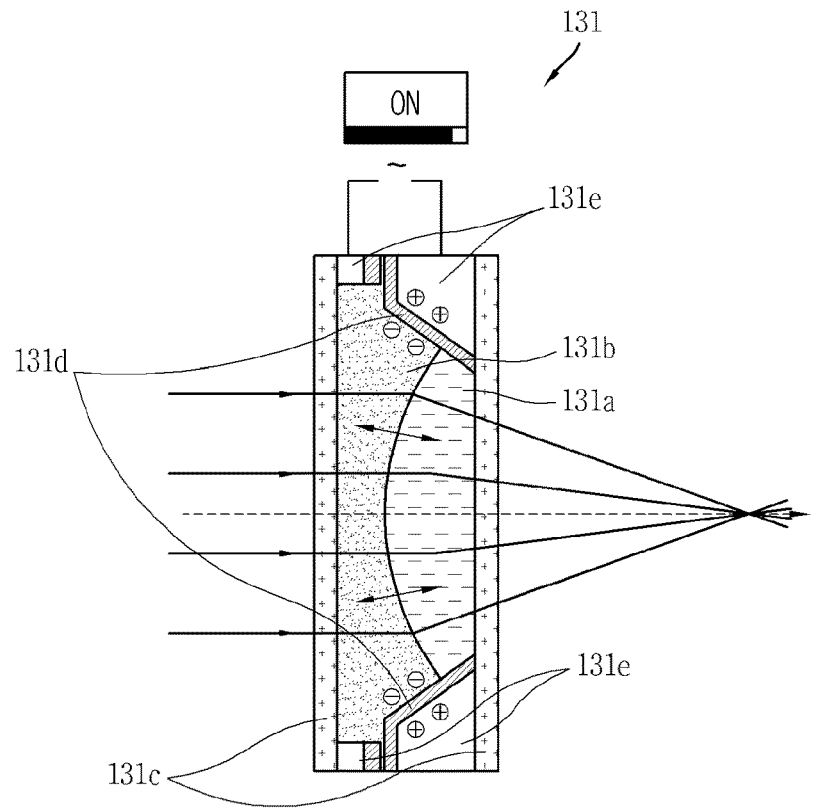
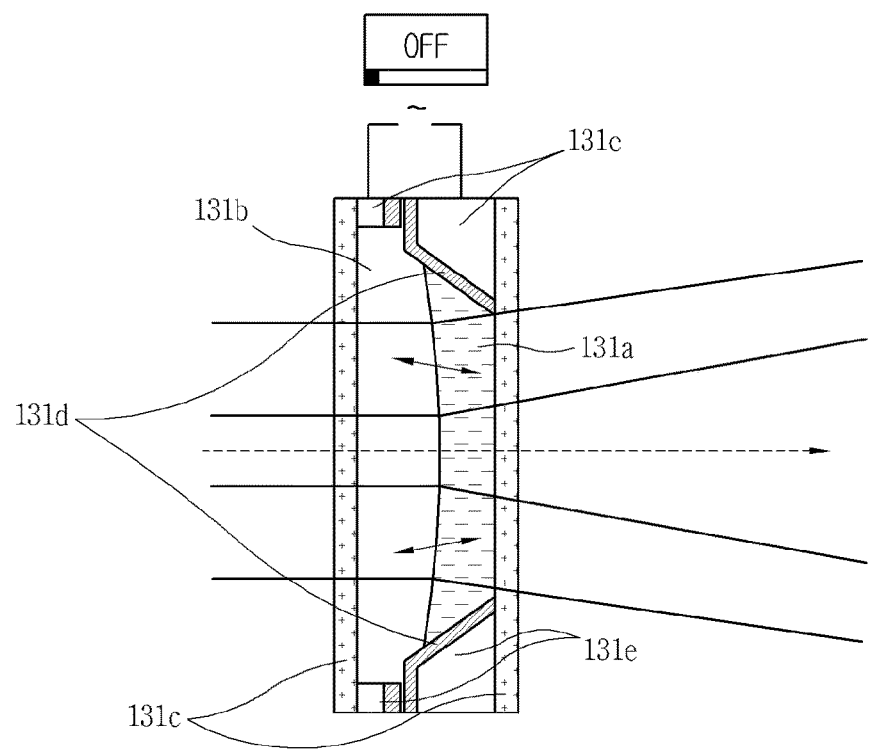

[Fig. 4A]
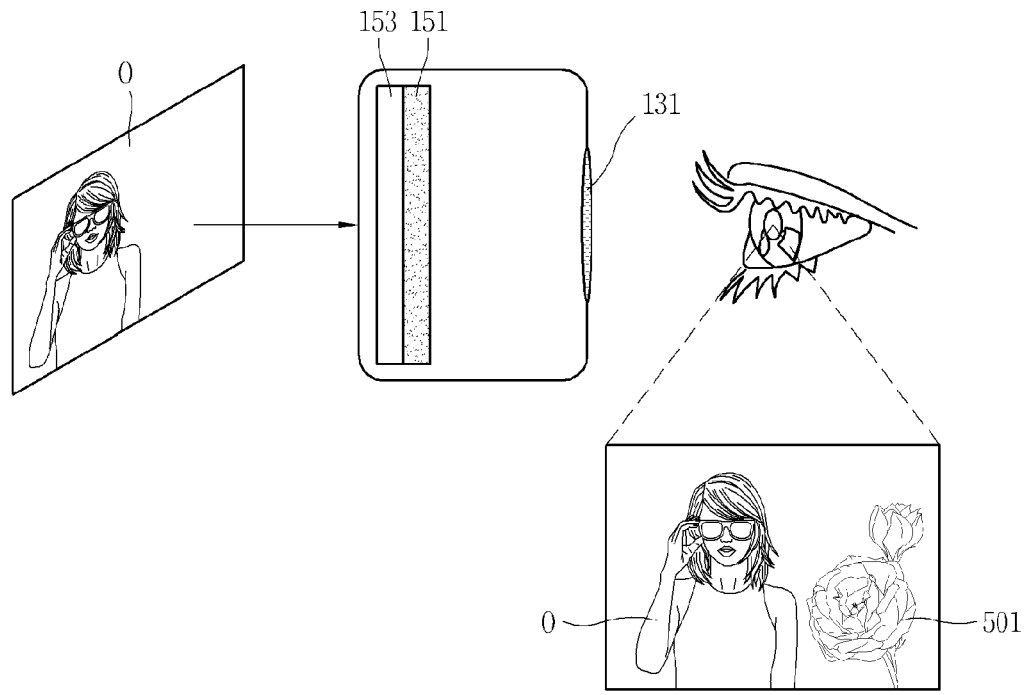
[Fig. 4B]
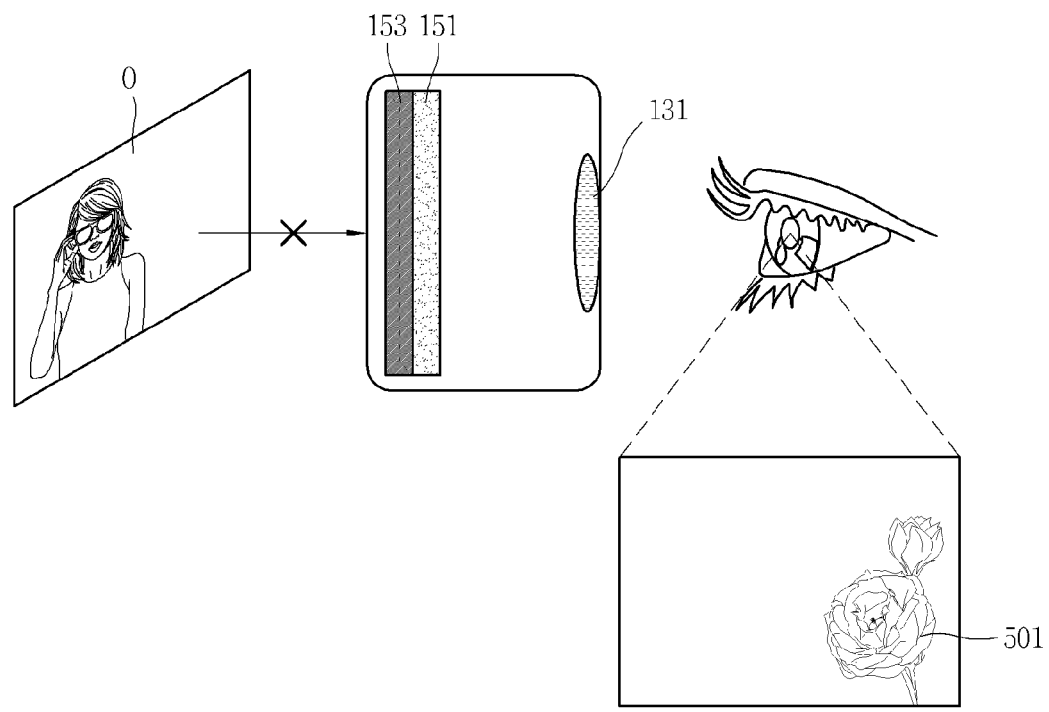

[Fig. 4C]
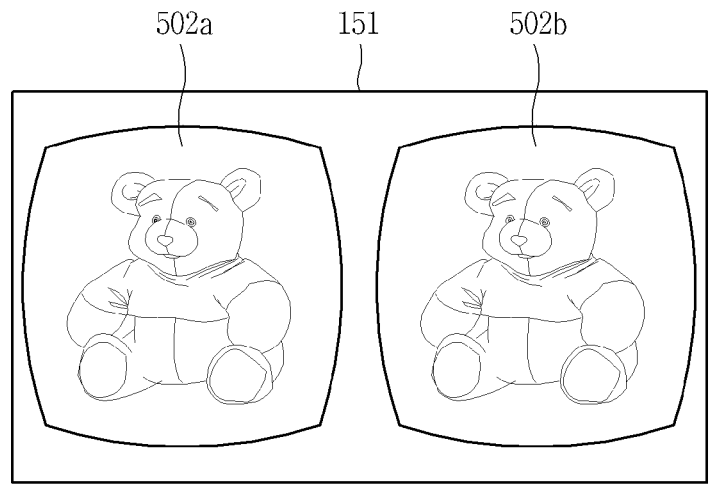
[Fig. 5]
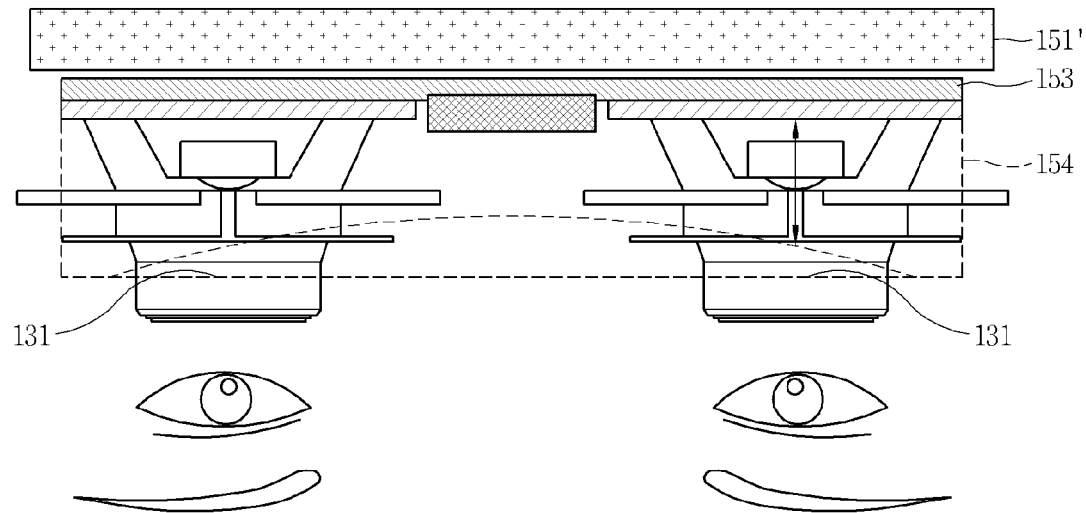

[Fig. 6A]
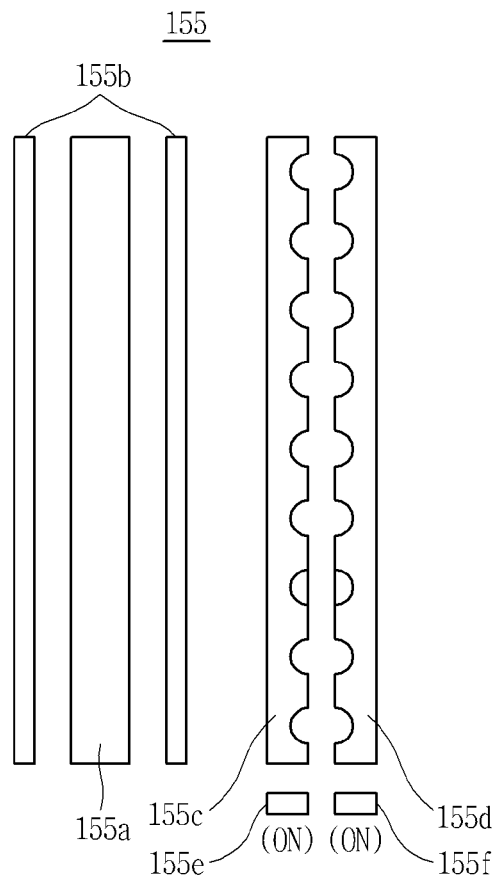
[Fig. 6B]
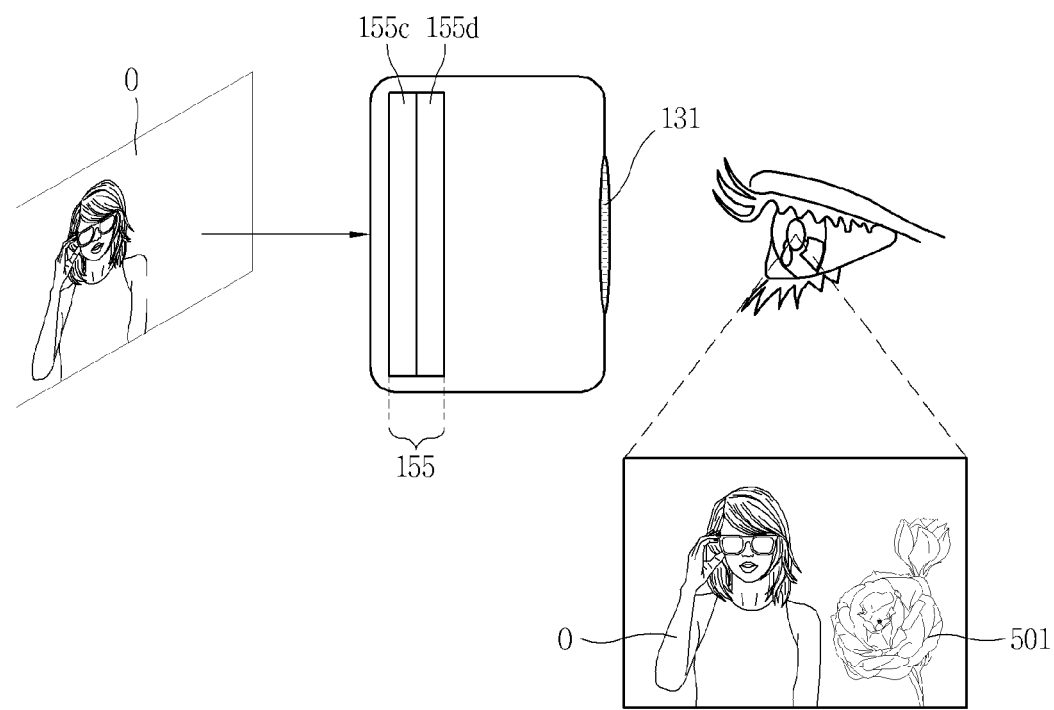

[Fig. 7A]
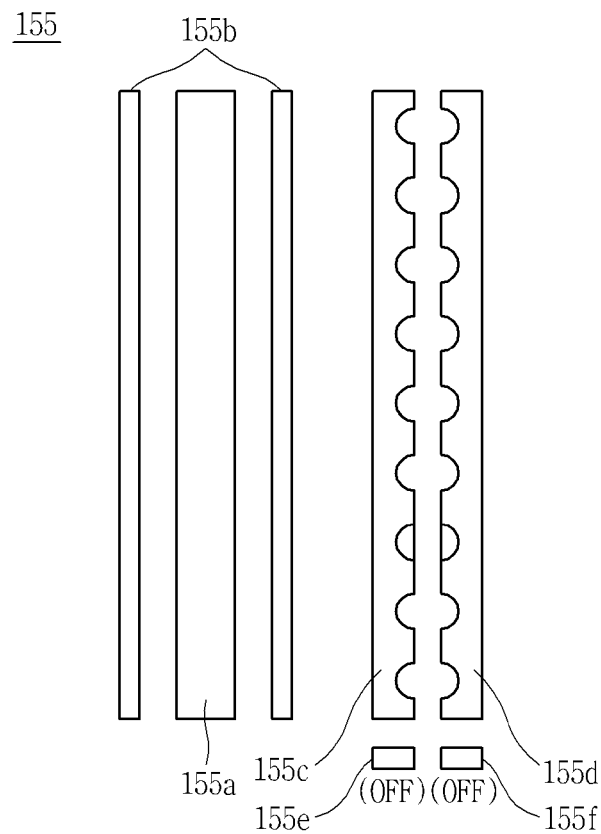
[Fig. 7B]
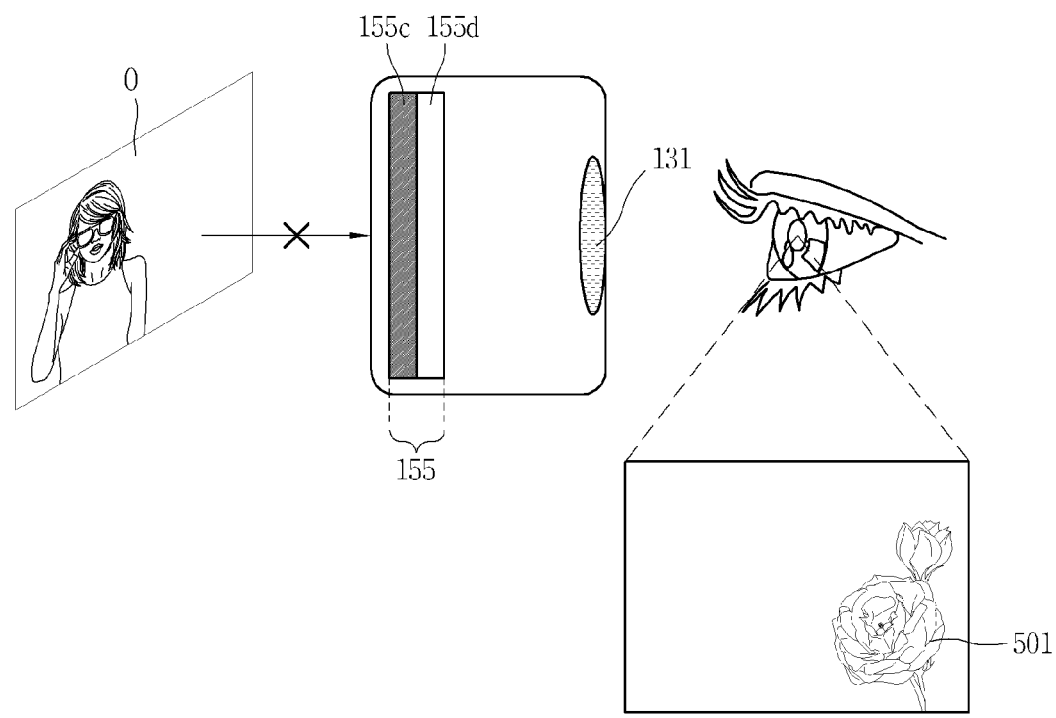

[Fig. 8A]
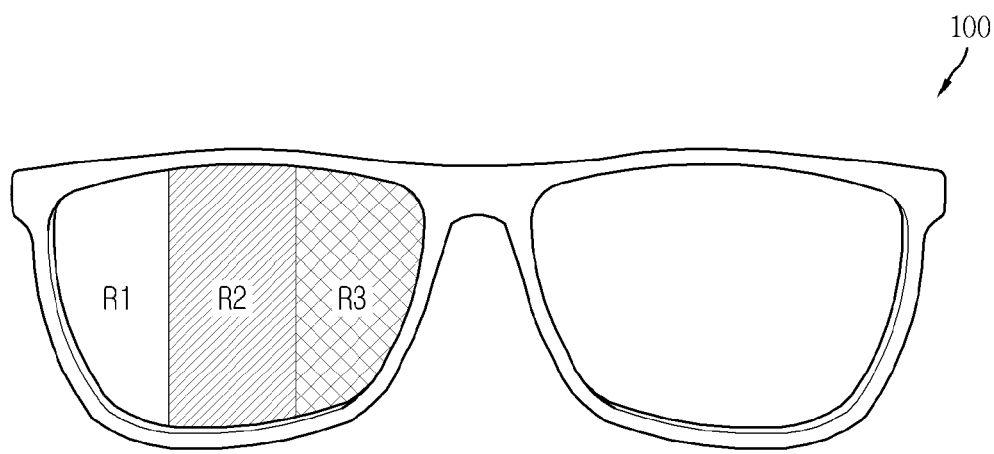
[Fig. 8B]
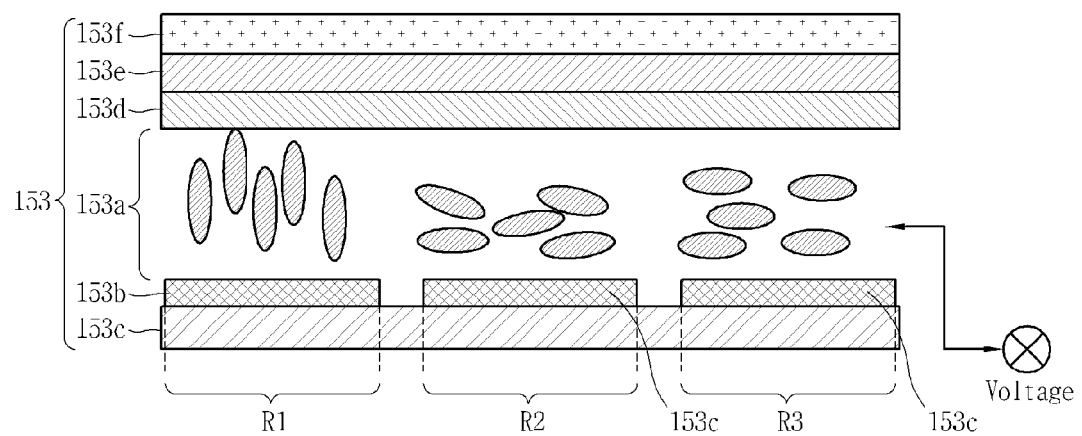

[Fig. 8C]
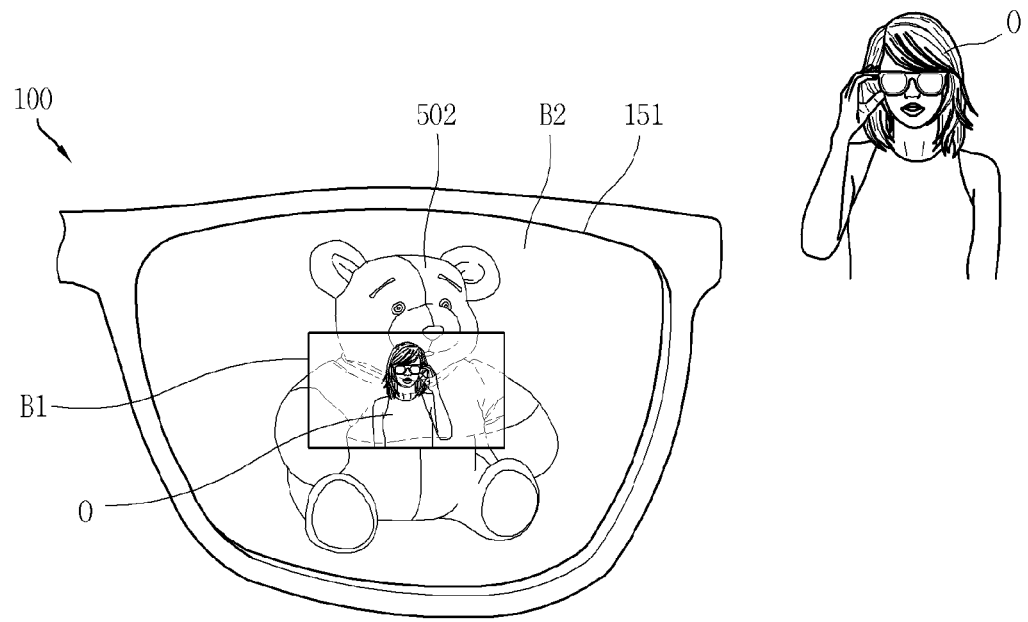
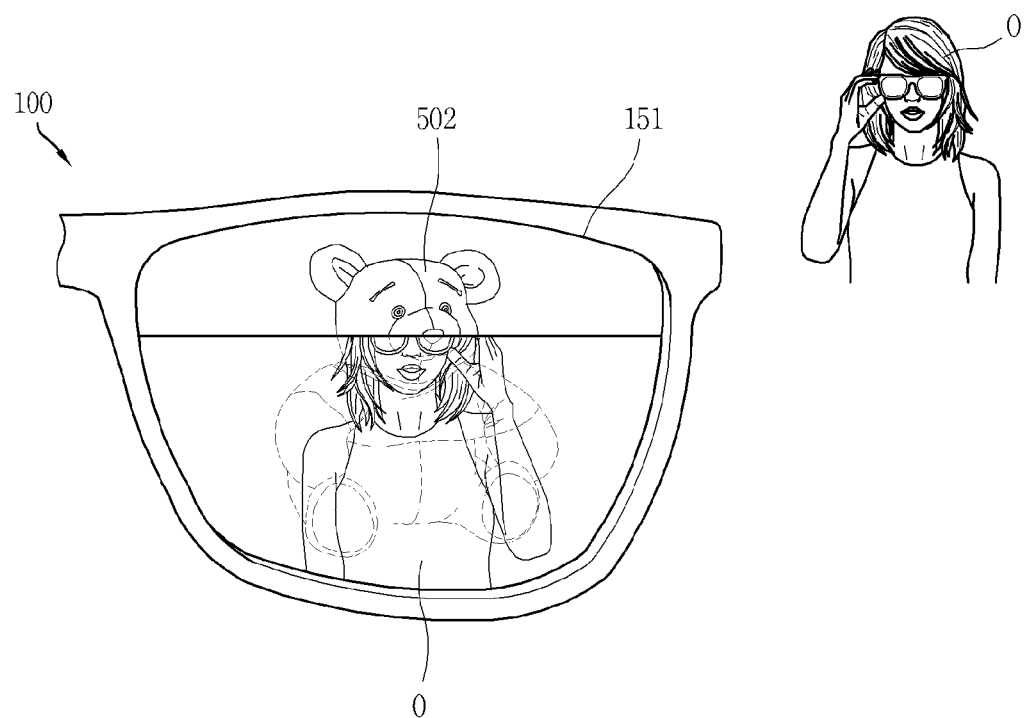

[Fig. 9A]
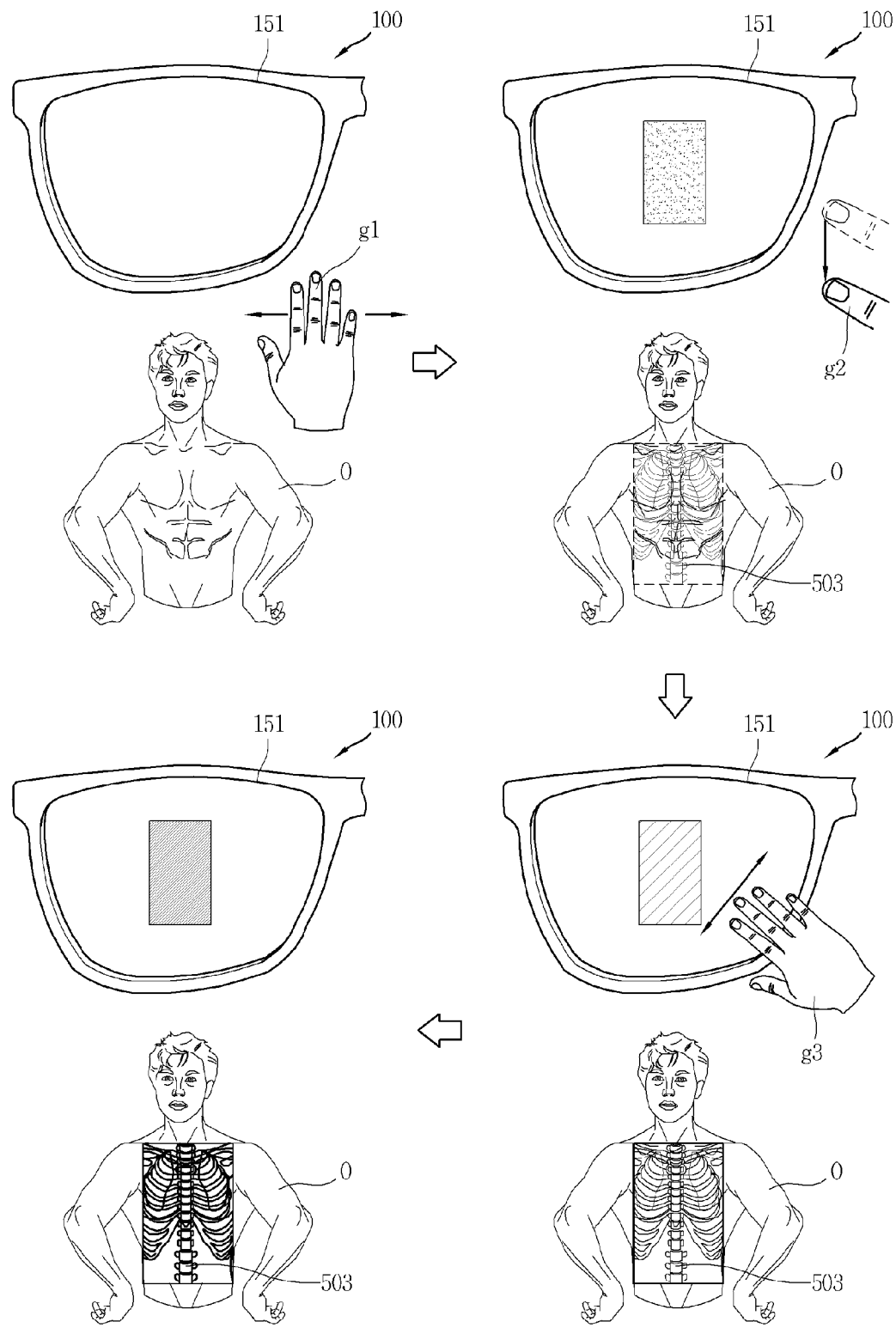

[Fig. 9B]
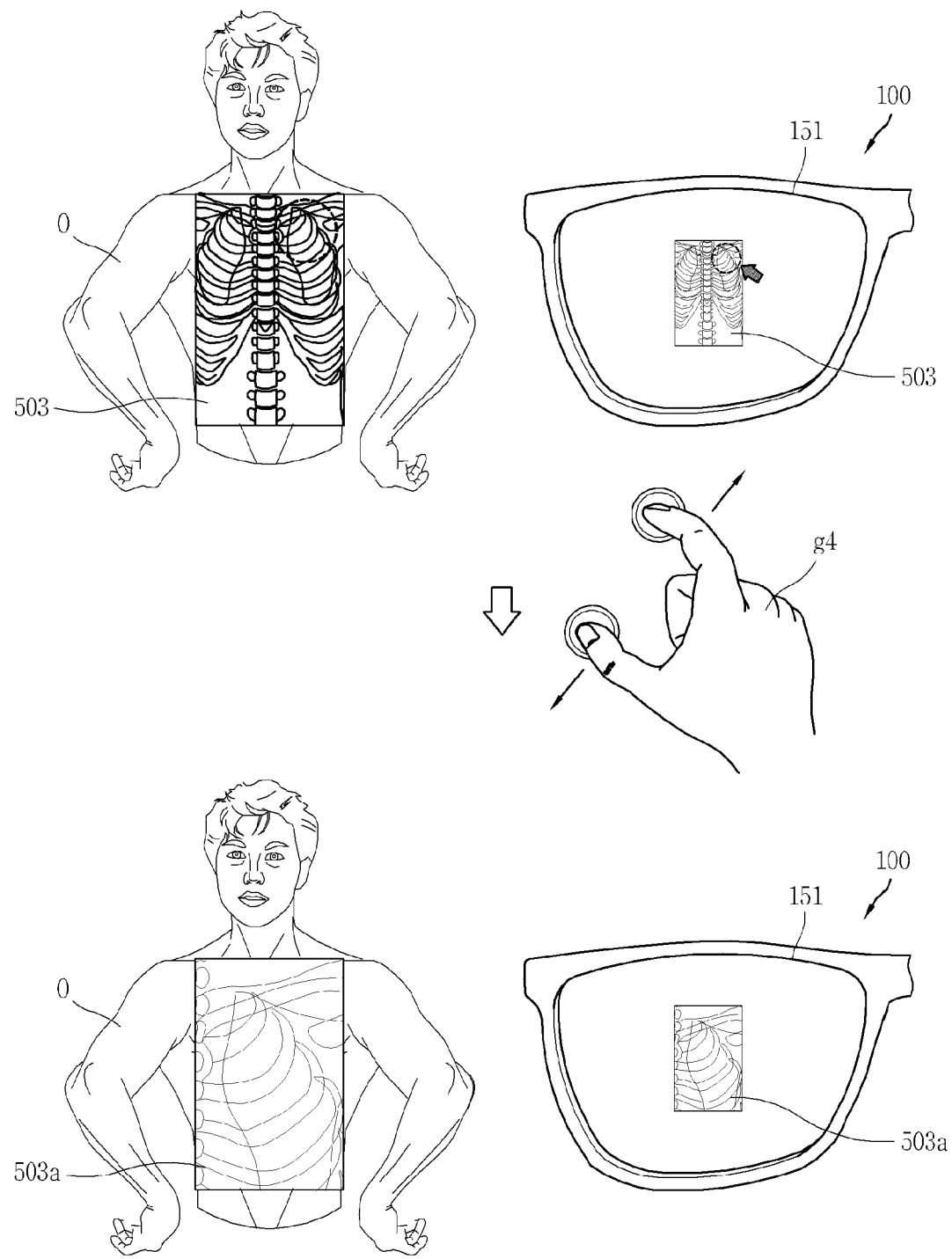

[Fig. 9C]
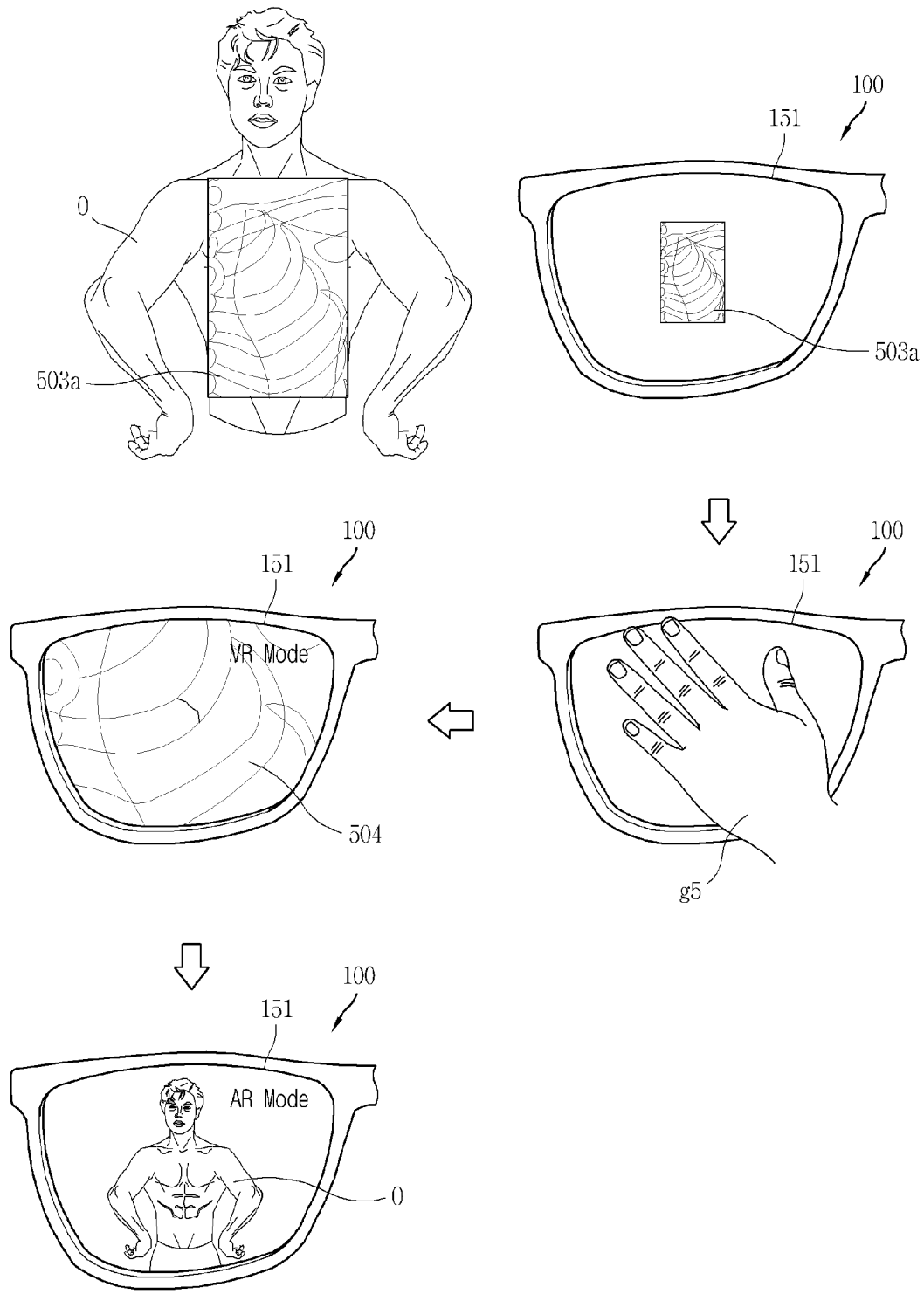

[Fig. 9D]
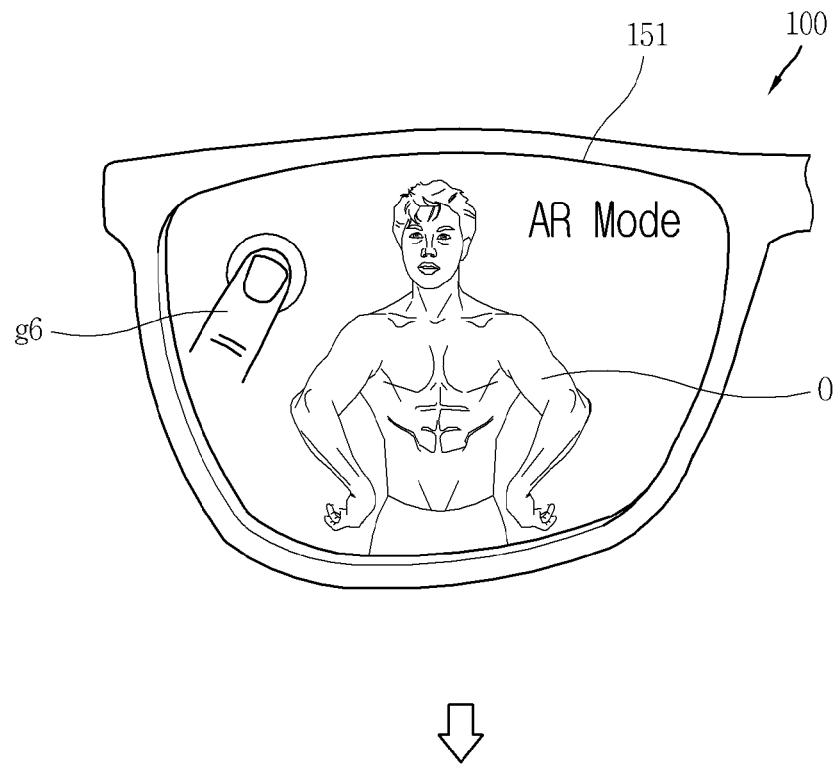
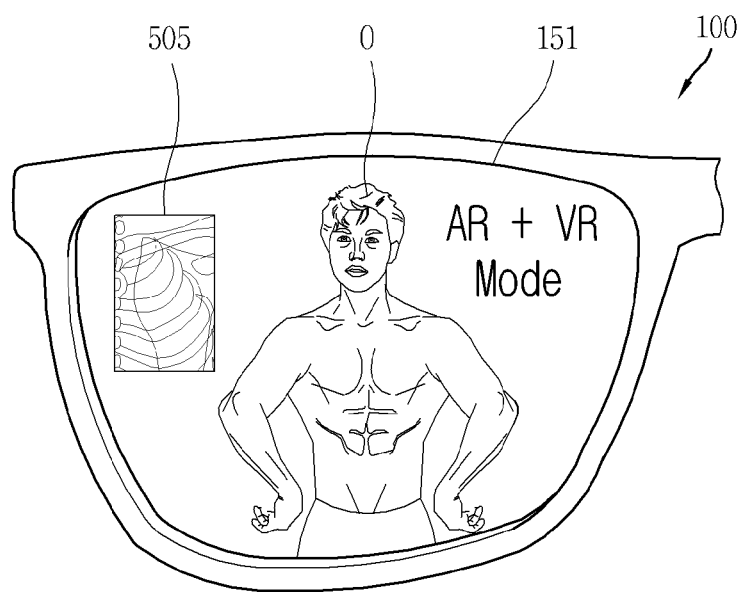

[Fig. 9E]
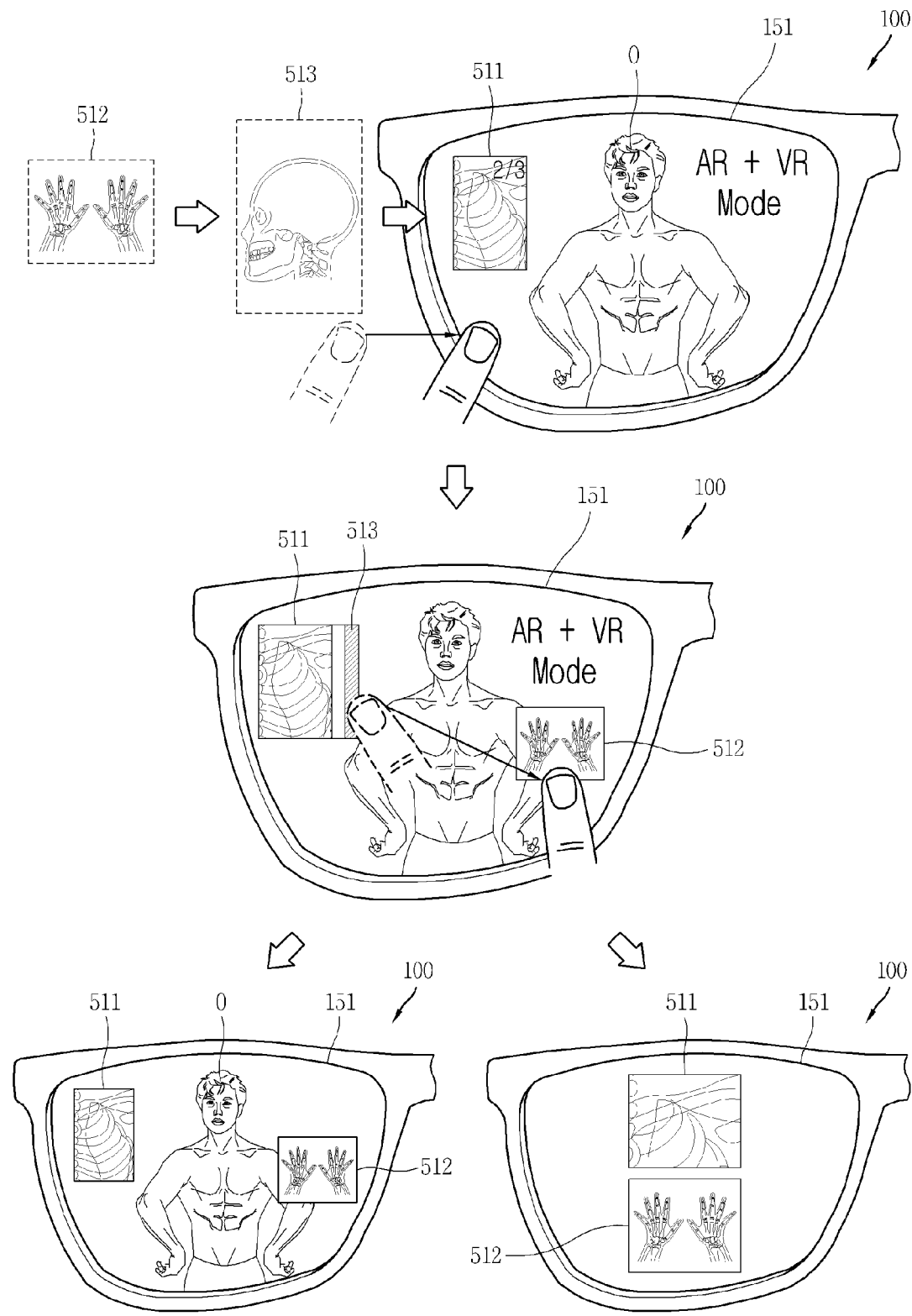

[Fig. 10]
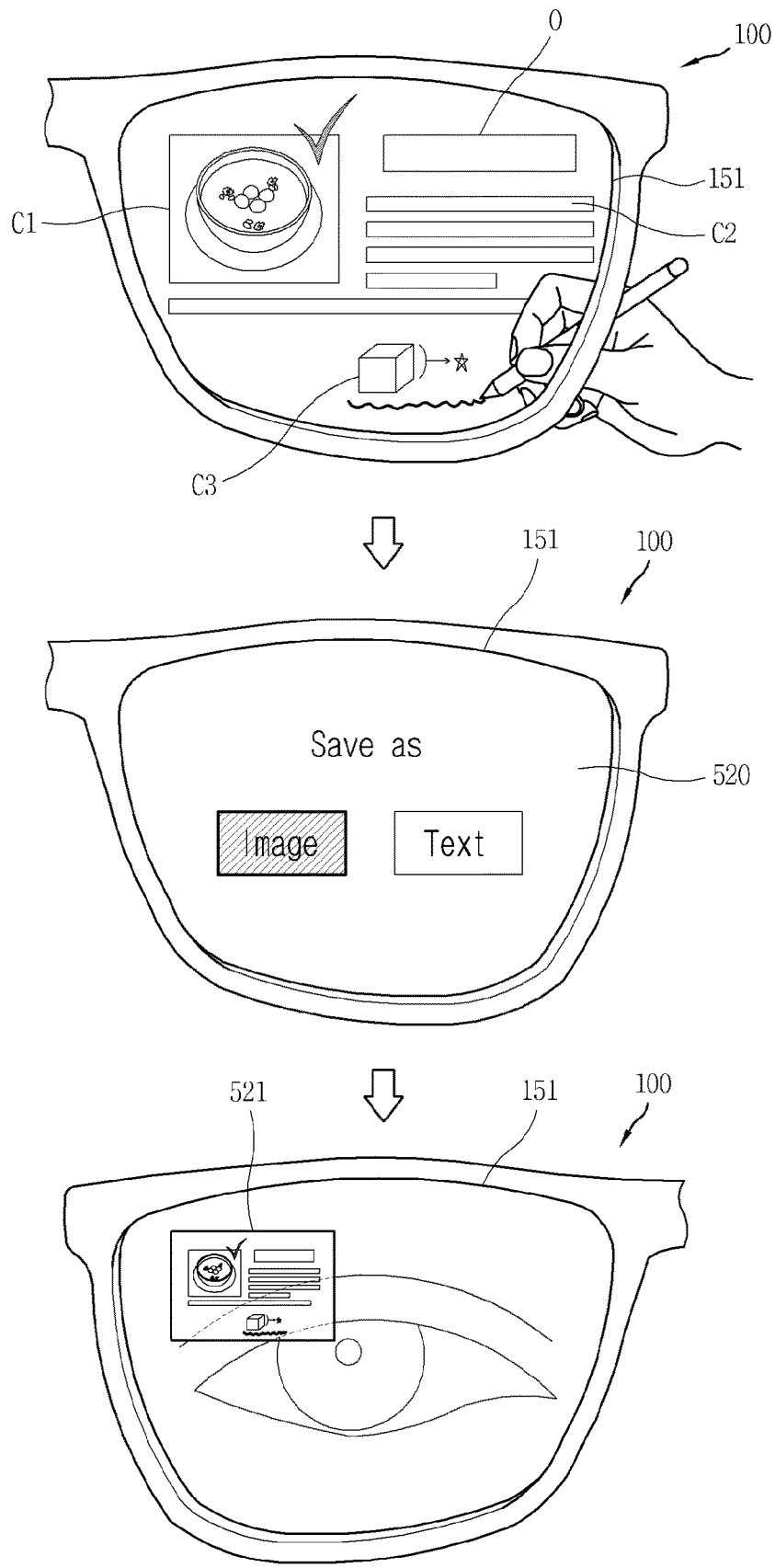

[Fig. 11A]
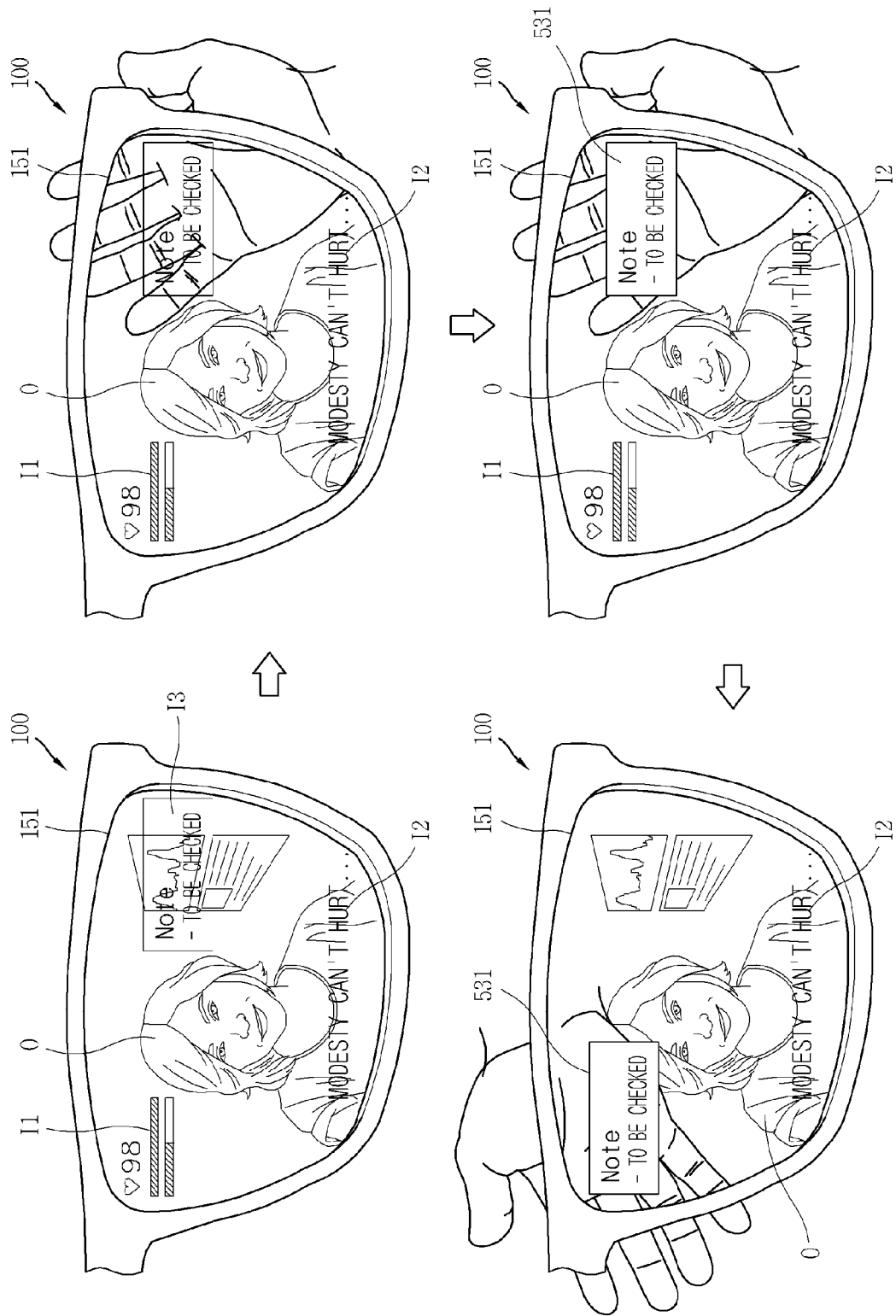

[Fig. 11B]
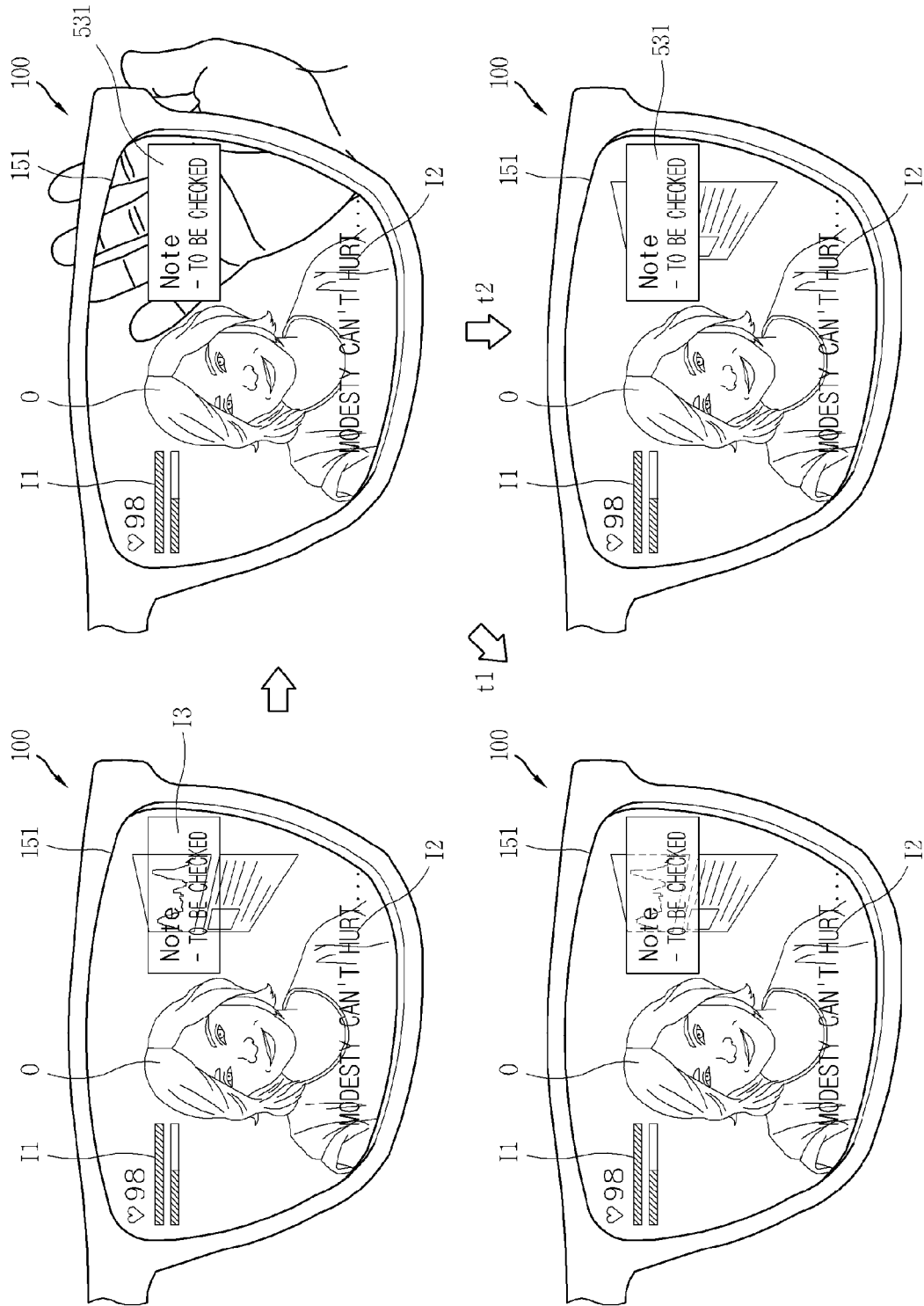

[Fig. 11C]
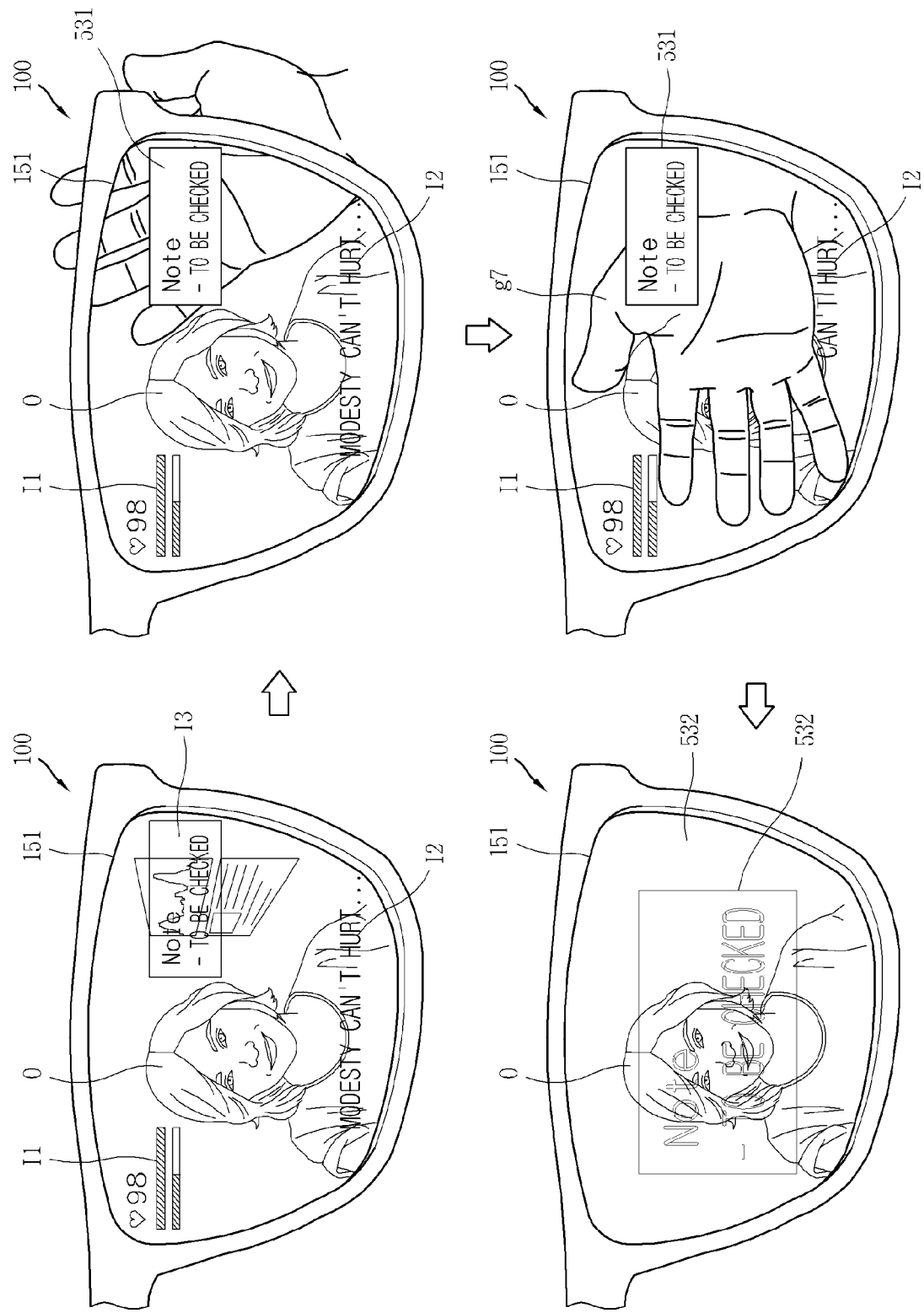

[Fig. 12A]
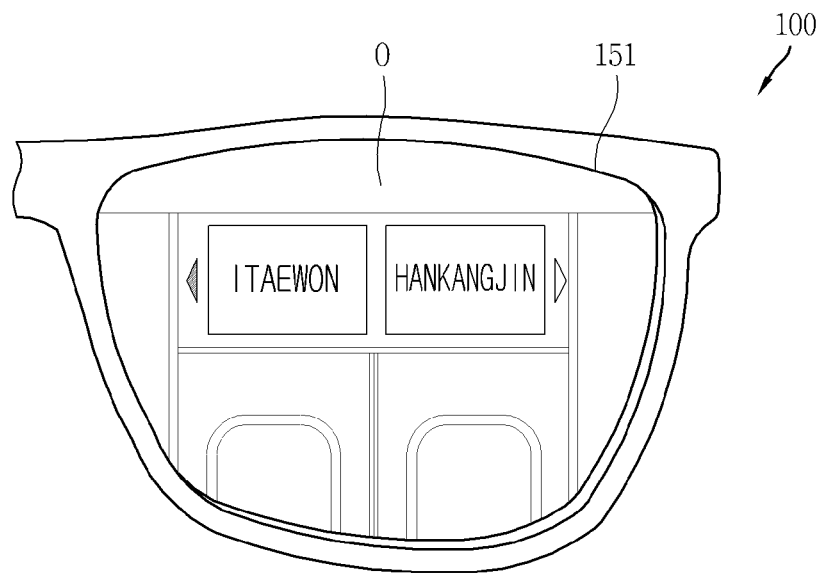
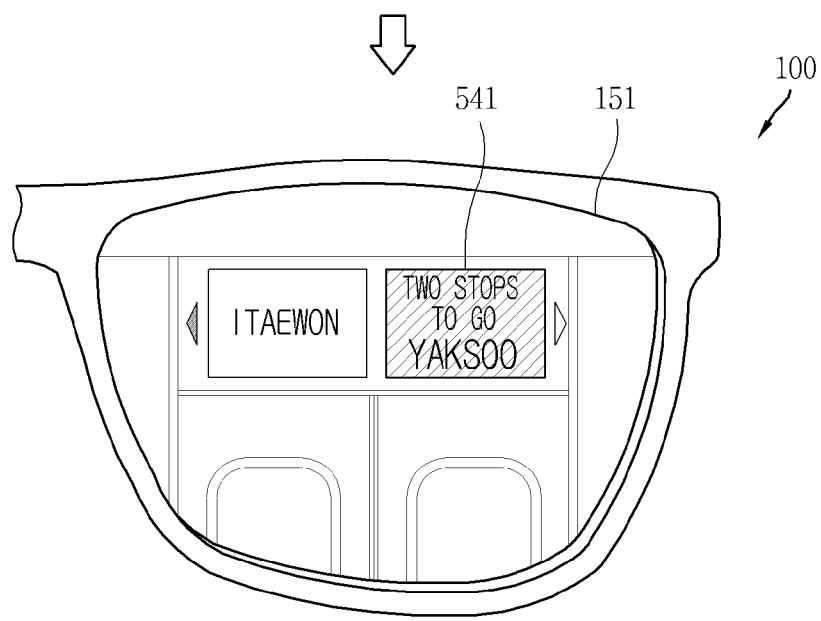

[Fig. 12B]
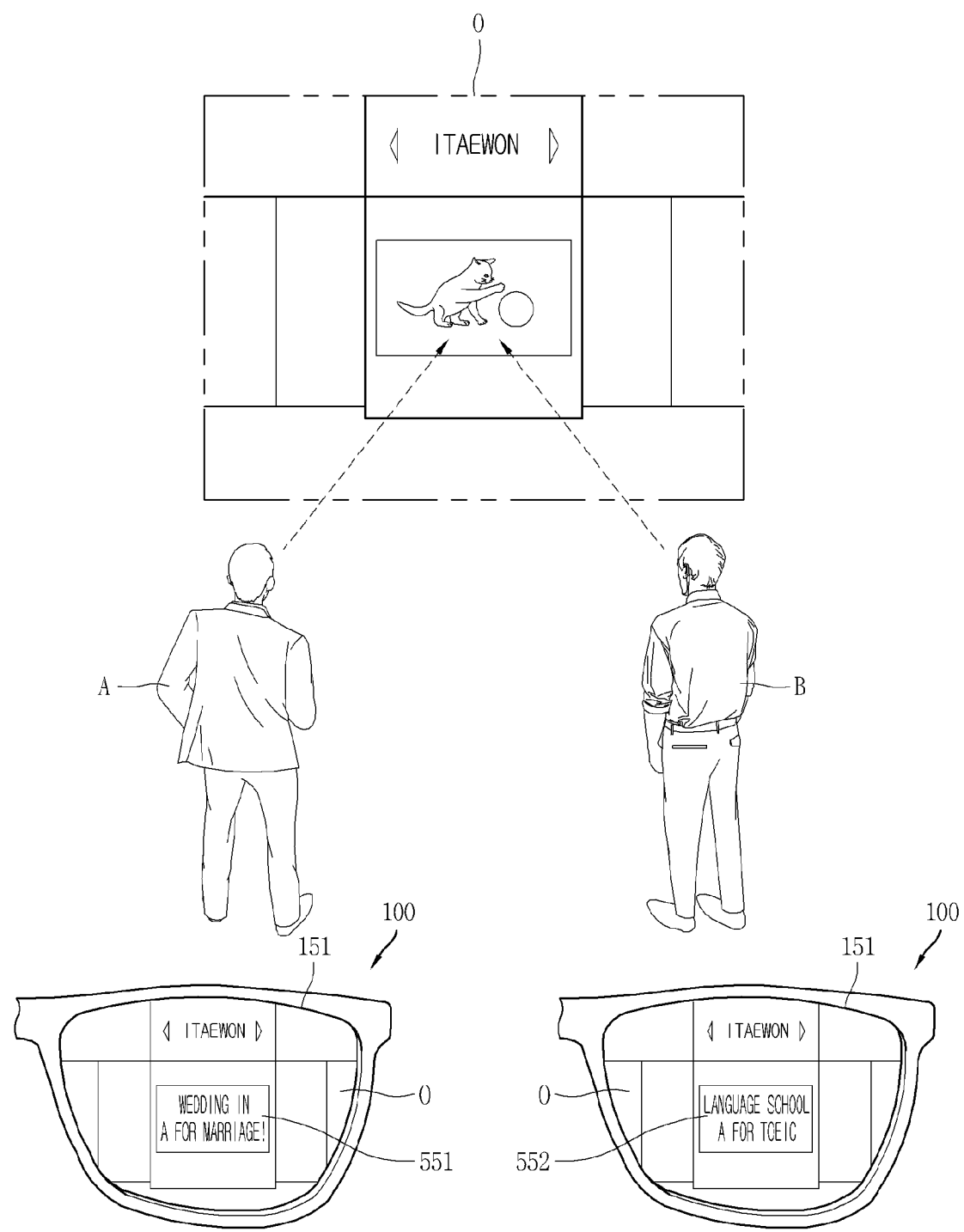

HEAD-MOUNTED DISPLAY AND METHOD OF CONTROLLING THE SAME

CROSS REFERENCE TO RELATED APPLICATIONS

This application is the National Phase of PCT International Application No. PCT/KR2017/007849, filed on Jul. 20, 2017, which is hereby expressly incorporated by reference into the present application.

TECHNICAL FIELD

The present disclosure relates to a head-mounted display outputting an image in a state in which the head-mounted display is worn on the head of a user.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device. Efforts are ongoing to support and increase the functionality of mobile terminals. Such efforts include software and hardware improvements, as well as changes and improvements in the structural components.

Recently, wearable glass type terminals formed to be worn on part of a human body have been developed. A glass type terminal worn on a user's head may be a head-mounted display (HMD). A display unit provided in a glass type terminal such as an HMD may be combined with augmented reality technology, N screen technology, and the like, beyond a simple image output function to provide various user conveniences.

A HMD includes an AR device outputting an image, while recognizing an external environment through a light-transmissive region and a VR device covering a visual field by a non-light transmissive region and outputting an image to the non-light transmissive region. The AR device and the VR device are different in that an external environment can be recognized or not and have shortcomings in that a VR image and an AR image cannot be output by a single device.

DISCLOSURE OF INVENTION

Technical Problem

An aspect of the present disclosure provides a head-mounted display worn on a user's head and switched between an AR mode and a VR mode.

Solution to Problem

According to an aspect of the present invention, a head-mounted display (HMD) includes: a frame configured to be fixated to a head; a light-transmissive display unit fixated to the frame and outputting a VR image in a VR mode and an AR image in an AR mode; a light transmission control layer having changed transmittance; a lens unit having a refractive index changed in the VR mode and the AR mode; and a controller control the light transmission control layer to increase transmittance in the AR mode and decrease transmittance in the VR mode.

In an example related to the present disclosure, the light transmission control layer may be formed of polymer-dispersed liquid crystal or a plurality of light guide plates including recess patterns and light sources. Thus, transmittance may be increased in an AR mode and decreased in a VR mode.

In an example related to the present disclosure, since the light transmission control layer is divided into a plurality of light transmission control regions and one region thereof may be switched to the AR mode, a user may recognize an external environment, without having to take off the HMD.

In an example related to the present disclosure, the AR mode and the VR mode may be switched therebetween on the basis of gesture information, or a region on which a VR image is output may be changed in an AR and VR mixture mode.

Advantageous Effects of Invention

According to the present disclosure, since transmittance is changed, the AR mode and the VR mode may be switched therebetween, and thus, an AR image and a VR image may be output by the single device.

BRIEF DESCRIPTION OF DRAWINGS

FIG. 1A is a block diagram illustrating a component of a head-mounted display (HMD) according to an embodiment of the present disclosure.

FIGS. 1B and 1C are views illustrating an HMD viewed in different directions.

FIG. 2 is a partial cross-sectional view of an HMD according to an embodiment of the present disclosure.

FIG. 3A is a conceptual view illustrating a structure of a transparent display.

FIG. 3B is a conceptual view illustrating a driving method of a light transmission control layer.

FIG. 3C is a conceptual view illustrating a focus adjusting unit included in a lens unit.

FIGS. 4A and 4B are conceptual views illustrating a control method of the HMD of FIG. 2.

FIG. 4C is a conceptual view illustrating a shape of an image output on a display unit in a VR mode.

FIG. 5 is a conceptual view illustrating an HMD according to another embodiment.

FIGS. 6A and 6B are conceptual views illustrating a control method of the HMD of FIG. 5.

FIGS. 7A and 7B are conceptual views illustrating a control method of the HMD of FIG. 5.

FIGS. 8A to 8C are conceptual views illustrating a control method of executing different modes in divided regions.

FIGS. 9A to 9E are conceptual views illustrating a control method of controlling a VR mode and an AR mode according to various embodiments.

FIG. 10 is a conceptual view illustrating a control method of outputting an image obtained through a camera, as a VR image.

FIGS. 11A to 11C are conceptual views illustrating a control method of changing an output mode of an output image.

FIGS. 12A and 12B are conceptual views illustrating a control method of outputting a VR image to a position set by an external environment.

MODE FOR THE INVENTION

Hereinafter, the embodiments of the present invention will be described with reference to the accompanying drawings, in which like numbers refer to like elements throughout although the embodiments are different, and a description of the like elements a first embodiment will be used for those of the different embodiment. In the following description, usage of suffixes such as 'module', 'part' or 'unit' used for referring to elements is given merely to facilitate explanation of the present invention, without having any significant meaning by itself. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings. Also, the present invention is not limited to a specific disclosed form, but includes all modifications, equivalents, and substitutions without departing from the scope and spirit of the present invention.

It will be understood that, although the terms first, second, etc. may be used herein to describe various elements, these elements should not be limited by these terms. These terms are only used to distinguish one element from another.

It is to be understood that when one element is referred to as being connected to or coupled to another element, it may be connected directly to or coupled directly to another element or be connected to or coupled to another element, having the other element intervening therebetween. On the other hand, it is to be understood that when one element is referred to as being connected directly to or coupled directly to another element, it may be connected to or coupled to another element without the other element intervening therebetween.

As used herein, the singular forms "a", "an" and "the" are intended to include the plural forms as well, unless the context clearly indicates otherwise.

It will be further understood that the terms "comprises" "comprising," "includes" and/or "including" when used herein, specify the presence of stated features, integers, steps, operations, elements, and/or components, but do not preclude the presence or addition of one or more other features, steps, operations, elements, components, and/or groups thereof.

FIG. 1A is a block diagram illustrating components of a head-mounted display according to an embodiment of the present disclosure.

An HMD 100 may include a wireless communication unit 110, an input unit 120, a lens unit 130, a sensing unit 140, an output unit 150, an interface unit 160, a memory 170, a controller 180, and a power supply unit 190. The components illustrated in FIG. 1A are not essential for realizing the HIVID 100 and the HMD 100 described in this disclosure may have fewer or greater components.

In detail, among the components, the wireless communication unit 110 may include one or more modules allowing radio communication between the HMD 100 and a wireless communication system, between the HMD 100 and another HMD, or between the HMD 100 and an external server. Also, the wireless communication unit 110 may include one or more modules connecting the HMD 100 to one or more networks.

The wireless communication unit 110 may include at least one of a broadcast receiving module, a mobile communication module, a wireless Internet module, a short-range communication module, a position information module.

The input unit 120 may include a camera 121 or an image input unit for inputting an image signal, a microphone 122 or an audio input unit for inputting an audio signal, and a user input unit 123 (e.g., a touch key, a mechanical key, etc.) for receiving information from a user. Audio data or image data collected from the input unit may be analyzed and processed as a control command of the user.

The sensing unit 140 may include one or more sensors for sensing at least one of information within the HMD 100, information of a surrounding environment of the HMD 100, and user information.

For example, the sensing unit 140 may include a proximity sensor, an illumination sensor, a compass sensor, an ambient light sensor, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor, (e.g., camera 121), a microphone 122, a battery gauge, an environment sensor (e.g., a barometer, a hygrometer, a thermometer, a radioactivity sensor, a thermal sensor, a gas sensor, etc.), and a chemical sensor (e.g., an electronic nose, a healthcare sensor, a biometric sensor, etc.). Meanwhile, the mobile terminal disclosed in the present disclosure may combine pieces of information sensed by at least two sensors among the foregoing sensors to utilize the same.

The output unit 150 serves to generate an output related to sense of sight, sense of hearing, sense of touch, and the like, and may include a display unit 151, an audio output unit 152, and a light transmission adjusting unit 153'.

The display unit 151 may form an inter-layer structure with a touch sensor tor integrally formed with the touch sensor to realize a touch screen. Such a touch screen may serve as the user input unit 123 providing an input interface between the HMD 100 and the user, and provide an output interface between the HMD 100 and the user.

The light transmission adjusting unit 153' may be disposed on the display unit 151 and controlled to change translucency in the AR mode and the VR mode. Accordingly, in a non-translucent state in which it is not possible to recognize an external environment, an image may be output by the display unit 151, or in a translucent state in which it is possible to recognize an external environment, an image output by the display unit 151 may be provided.

The interface unit 160 serves as an interface with various types of external devices that can be coupled to the HMD 100. The interface unit 160, for example, may include at least one of wired or wireless ports, external power supply ports, wired or wireless data ports, memory card ports, ports for connecting a device having an identification module, audio input/output (I/O) ports, video I/O ports, earphone ports, and the like. In some cases, the HMD 100 may perform assorted control functions associated with a connected external device, in response to the external device being connected to the interface unit 160.

Also, the memory 170 stores data supporting various functions of the HMD 100. The memory 170 may be configured to store application programs (or applications) executed in the HMD 100, data or instructions for operations of the HMD 100, and the like. Some of these application programs may be downloaded from an external server via wireless communication. Other application programs may be installed within the HMD 100 at time of manufacturing or shipping, which is typically the case for basic functions of the HMD 100. It is common for application programs to be stored in the memory 170, installed in the HMD 100, and executed by the controller 180 to perform an operation (or function) for the HMD 100.

The controller 180 typically functions to control overall operation of the HMD 100, in addition to the operations associated with the application programs. The controller 180 may provide or process information or functions appropriate for a user by processing signals, data, information and the like, which are input or output by the various components described above, or activating application programs stored in the memory 170.

The power supply unit 190 receives external power or internal power and supply power to each of the components included in the HMD 100 under the control of the controller 180. The power supply unit 190 may include a battery, and the battery may be an internal battery or a replaceable battery.

At least some of the components may operate in cooperation with each other to operate or control the HMD 100 or realize a control method of the HMD 100 according to various embodiments described hereinafter. Also, an operation, controlling, or a control method of the HMD 100 may be realized in the HMD by driving of at least one application program stored in the memory 170.

The lens unit 130 includes a liquid lens 131. The liquid lens 131 adjusts focus of an image output on the display unit 151.

Hereinafter, before describing various embodiments realized through the HMD 100 discussed above, the aforementioned components will be described in detail with reference to FIG. 1A.

FIGS. 1B and 1C are views of an HMD according to an embodiment of the present disclosure, viewed in different directions.

Referring to FIGS. 1B and 1C, the HMD 100 includes a frame 101 fixated to a head of a user, a support frame 102 supporting a nose of the user, and the display unit 151 and the lens unit 130 fixated to the frame 101, disposed to cover both eyes, and outputting an image.

The display unit 151 and the lens unit 130 are disposed to overlap. When the HMD is worn on the user's head by the frame 101, an image output from the display unit 151, or the like, is adjusted in a focal length by the lens unit 130 and provided to both eyes of the user.

In the HMD 100 according to the present disclosure, a refractive index of the lens unit 130 is adjusted and transmittance of the display unit 151 is adjusted. Thus, the HMD 100 is realized to recognize an external environment through a light-transmissive region in the AR mode and realized to output an image in an opaque state in which an external environment is not recognized. Components of the present disclosure for realizing the AR mode and the VR mode will be described.

FIG. 2 is a partial cross-sectional view of an HMD according to an embodiment.

The HMD 100 according to the present disclosure includes a lens unit 130, a window 151', a light transmission control layer 153, a display unit 151, and a light guide unit 154.

The window 151' forms an appearance of the HMD 100. The window 151' is formed of a light-transmissive material and protects an internal component of the HMD 100.

The display unit 151 is implemented as a transparent organic light emitting diode (OLED) display panel. An image is output by the light-transmissive material. Thus, the display unit 151 outputs an image to be projected on the window 151' in the AR mode and outputs a high quality image in the VR mode.

Meanwhile, the light transmission control layer 153 adjusts transmittance on the basis of a control command. The control command is a control command for switching the AR mode and the VR mode, and in the AR mode, the light transmission control layer 153 is switched to a light-transmissive state, and in the VR mode, the light transmission control layer 153 is switched to a non-light transmissive state. The light transmission control layer 153 is disposed between the display 151 and the window 151'. Thus, in the AR mode, transmittance is increased to recognize an external environment of the user, and in the VR mode, transmittance is reduced and an image is provided in a state in which an external environment is not recognized in an opaque state.

The light guide unit 154 is disposed on the display unit 151. The light guide unit 154 transmits light such that an image output from the display unit 151 reaches both eyes of the user through the lens unit 130, without being leaked to the outside.

The lens unit 130 includes the liquid lens 131, and the liquid lens 131 is formed to have different refractive indices in the AR mode and the VR mdoe and adjusts a focal length of an image in each mode.

Hereinafter, the light-transmissive display unit 151, the light transmission control layer 153, and the liquid lens 131 will be described.

FIG. 3A is a conceptual view illustrating a structure of a transparent display.

Referring to FIG. 3A, the display unit 151 includes a plurality of cells, and each cell includes a transmission region A and an emission region B. The emission region B includes a plurality of layers for outputting an image. For example, the emission region B includes a touch sensor, a color filter layer, an OLED layer, a TFT layer formed on a base substrate, a light source layer, and the like. Meanwhile, the transmission region A does not include a plurality of layer for outputting an image.

Transmittance of the display unit 151 is determined by an aspect ratio and transmissivity of the transmission region A. As the transmission region A is increased, transmittance of the display unit 151 is enhanced.

FIG. 3B is a conceptual view illustrating a driving method of a light transmission control layer.

Referring to FIG. 3B, the light transmission control layer 153 is implemented by a polymer-dispersed liquid crystal (PDLC) whose transmittance is changed on the basis of a control signal. The PDLC is a composite material obtained by evenly dispersing liquid crystal drops 153*a* in a micron scale to a polymer matrix.

When a voltage is applied to both electrodes with the liquid crystal drops 153*a* interposed therebetween, the liquid crystal drops 153*a* are aligned in one direction. When the liquid crystal drops 153*a* are aligned in one direction, light transmits along the liquid crystal drops 153*a* to enhance transmittance. When a voltage is not applied to the both electrodes, the liquid crystal drops 153*a* are arranged in arbitrary different directions, preventing light transmission to degrade transmittance.

Thus, the light transmission control layer 153 maintains a high transmittance state in the AR mode so that the user may recognize an external environment through the display unit 151, the light transmission control layer 153, and the window 151' and recognize an image projected on the external environment. Meanwhile, in the VR mode, transmittance of the light transmission control layer 153 is lowered, and thus, the user cannot recognize an external environment and recognize only an image output from the display unit 151.

FIG. 3C is a conceptual view illustrating a liquid lens included in a lens unit.

Referring to FIG. 3C, the liquid lens 131 is formed as a liquid lens whose thickness is changed. The lens includes a first material 131a and a second material 131b disposed between base windows 131c, and a pair of electrode units 131e for applying a voltage to the first and second materials 131a and 131b. The pair of electrode units 131e are disposed to apply a current to the second material 131b. An insulating layer 131d is formed between the electrode units 131e to insulate the electrode units 131e. The first material 131a is formed of water, and the second material is formed of oil. The first material 131a is formed of a liquid not allowing transmission of electricity, and the second material is formed of a liquid allowing transmission of electricity. The first and second materials 131a and 131b are received between the base window 131d and not mixed.

When a voltage is applied to the both electrodes, the first material 131a is deformed to be convex. When the first material 131a becomes convex, the first material 131a is formed as a convex lens, a focal length thereof is reduced, and a distance in which an image is formed is adjusted to be close to the eyes.

When a voltage is not applied to both electrodes, the first material 131a is deformed to be flat. Accordingly, a refractive index is changed and an image is supplied to the user's eyes in a state that a focal length is not changed.

The controller 180 applies a voltage to the lens unit 131 to implement a convex lens to adjust a focal length in the VR mode, and does not apply a voltage to the lens unit 131 in the AR mode.

Thus, even when a distance between the display unit 151 and the both eyes is short, a focal length may be adjusted through the lens 130 such that an image is output to be close to the both eyes.

Referring to FIGS. 2 to 3C, in the AR mode, the controller 180 performs control to increase transmittance of the light transmission control layer 153 and not to apply power to the lens unit 130. In the VR mode, the controller 180 lowers transmittance of the light transmission control layer 153 and applies power to the lens unit 130 to adjust a focal length.

Accordingly, the HMD according to the present disclosure may provide an image in a user desired manner in the VR mode and the AR mode.

FIGS. 4A and 4B are conceptual views illustrating a control method of the HMD of FIG. 2.

FIG. 4A is a conceptual view illustrating a control method in the AR mode and FIG. 4B is a conceptual view illustrating a control method in the VR mode.

Referring to FIG. 4A, in a state that translucency of the light transmission control layer 153 of the HMD 100 is increased, the user may view an external environment O through the transparent display 151 and the light transmission control layer 153. The display unit 151 outputs a first image 501. Accordingly, the user may view the first image 501 together with the external environment O. The first image 501 may be provided to overlap the external environment.

Referring to FIG. 4B, the light transmission control layer 153 of the HMD 100 is reduced in translucency and switched to be opaque. Accordingly, the user cannot view the external environment O due to the light transmission control layer 153. Here, a voltage is provided to the lens unit 130 and the liquid lens may be formed as a convex lens to adjust a focal length.

FIG. 4C is a conceptual view illustrating a shape of an image output on a display unit in the VR mode.

Referring to FIG. 4C, the display unit 151 outputs first and second images 502a and 502b with distorted edges. In the VR mode, the lens unit 130 is implemented as a convex lens. An image output through the convex lens is refracted in edge regions to output a distorted image.

Thus, the display unit 151 provides the reversely distorted first and second images 502a and 502b to the user's body eyes. For example, the first and second images 502a and 502b may be formed such that edges thereof form a convex surface. The first and second images 502a and 502b in which the edges are distorted to have a convex curved surface are output as square images with flat edges by the lens unit 130 implemented as the convex lens. Thus, the controller 180 may perform the image output in the VR mode through rendering. Accordingly, the user may be provided with the images without distortion.

FIG. 5 is a conceptual view illustrating an HMD according to another embodiment. FIGS. 6A and 6B are conceptual views illustrating a control method of the HMD of FIG. 5.

Referring to FIGS. 5 and 6A, the HMD 100 includes a display unit 155 disposed below the window and including a plurality of light guide plates. The display unit 155 includes a liquid crystal display panel 155a, a pair of polarizing plates 155b disposed on opposing sides of the liquid crystal display panel 155a to polarizer light, first and second light guide plates 155c and 155d, and first and second light sources 155e and 155f providing light to the first and second light guide plates 155e and 155d, respectively.

The liquid crystal display panel 155a includes a liquid crystal layer, a thin film transistor (TFT) layer, a color filter layer, and the like. The first and second light sources 155e and 155f are disposed on one surface of the first and second light guide plates 155c and 155d, and the first and second light guide plates 155c and 155d changes light provided from the first and second light sources 155e and 155f into a surface light source.

The controller 180 controls the second light guide plate 155d to adjust transparency of the display unit 155. The first and second light guide plates 155c and 155d include recess patterns formed on surfaces facing each other. The first and second light guide plates 155c and 155d include a plurality of recesses. The recess pattern of the first guide plate 155c is configured to allow light incident from the first light source 155e to be subsequently totally reflected (reflection, refraction, scattering) to generate a source light source in a direction toward an upper surface on which the liquid crystal display panel 155a is disposed. Also, the recess pattern of the second light guide plate 155c is configured to allow light incident from the second light source 155f to be subsequently totally reflected (reflection, refraction, scattering) to generate a surface light source in an opposite direction of the liquid crystal display panel 155a, i.e., in a direction toward a lower surface of the second light guide plate 155d.

In the AR mode, the display unit 155 is switched to a transparent state. In the AR mode, the first and second light sources 155e and 155f are turned on and the controller 180 causes light to be incident to the first and second light guide plates 155c and 155d.

Light moving in the direction toward the lower surface of the second light guide plate 155d illuminates a rear side of the display unit 151, i.e., an object positioned outside the HMD 100. When an about 30% of surface light source is emitted in a direction in which the recess pattern is formed by the second light source 155f, a phase different is made with a surface light source of the first light guide plate 155c due to a difference between a distance over which light from the first light guide plate 155c travels and a distance over which light from the second light guide plate 155d travels, implementing a transparent display unit 155. That is, since a light source of the second light guide plate 155d is transmitted to the user through the liquid crystal display panel 155a, the object may be detected to be brighter by the upper and lower surface light sources of the second light guide plate 155d.

When polarized light from the first and second light guide plates 155c and 155d is mixed and passes through the liquid crystal display panel 155a and one polarizing plate 155b, the object positioned on the rear side of the second light guide plate 155d is viewed, while displaying an image on the liquid crystal display panel 155a.

Brightness of light output from the second light source 155f is preferably about 1.3 times to about 1.5 times brightness of light output from the first light source 155e.

Meanwhile, when the second light source 155f is OFF, the second light guide plate 155f does not generate independent light (first and second polarized light), the liquid crystal display panel 155a turns to be opaque. That is, since the liquid crystal display panel 155a may be able to output an image only by a surface light source from the first light guide plate 155c and the first light source 155e, the liquid crystal display panel 155a turns to be non-light-transmissive.

A light source traveling inwardly to the first light guide plate 155c includes both first and second polarized light. The first and second polarized light undergoes a total reflection (reflection, refraction, and scattering) process through the recess patterns and is output in the form of a surface light source in a direction in which the liquid crystal display panel 155a is disposed.

The second light source 155f is incident to the second light guide plate 155d and totally reflected by the recess patterns so as to output a surface light source in a downward direction, and a portion of a light amount is output in a direction toward the first light guide plate 55c.

When the second light source 155f is OFF, the second light guide plate 155d does not generate independently light, and thus, the liquid crystal display panel 155a is switched to a non-transparent mode.

Referring to FIGS. 6A and 6B, in the AR mode, the controller 180 turns on the first and second light sources 155e and 155f to switch to a transparent state in which the external environment O can be recognized. Here, the controller does not apply power to the liquid lens 131. Accordingly, a first image 501 output from the display unit 155 may be recognized together with the external environment O.

FIGS. 7A and 7B are conceptual views illustrating a control method of the HMD of FIG. 5.

Referring to FIGS. 7A and 7B, in the VR mode, the controller 180 turns on the first light source 155e and turns off the second light source 155f, so that the display unit 155 is non-light-transmissive. Also, the controller 180 applies a voltage to the liquid lens 131 to implement a convex lens. thus, a first image 501 adjusted in a focal length is output by the non-light-transmissive display unit 155.

FIGS. 8A and 8B are conceptual views illustrating a control method of executing different modes in divided regions.

The light transmission control layer 153 according to FIGS. 8A and 8B include a plurality of divided light transmission control regions R1, R2, and R3. In FIG. 8A, the plurality of divided light transmission control regions R1, R2, and R3 are illustrated to be divided vertically, but the shape of the divided regions is not limited thereto.

Referring to FIG. 8B, the light transmission control layer 153 may include a polymer dispersed liquid crystal layer 153a, a plurality of reflective layers 153b, a semiconductor layer (CMOS) 153c, an alignment film 153d, a transparent electrode layer 153e, and a cover glass 153f. The plurality of reflective layers 153b are arranged as a plurality of reflective members according to the plurality of divided light transmission control regions R1, R2, and R3 of the light transmission control layer 153. Liquid crystal molecules corresponding to the plurality of reflective layers 153b may be adjusted in transparency on the basis of a voltage applied to each region.

For example, liquid crystal molecules may be arranged in a vertical direction in the first light transmission control region T1 to enhance transparency, and liquid crystal molecules may be arranged in a horizontal direction in the third light transmission control region T3 to make the third light transmission control region T3 opaque. Also, the controller 180 may apply a voltage such that the liquid crystal molecules are freely arranged, thus adjusting transmittance to a middle state.

Referring to FIG. 8C, the controller 180 may adjust transmittance of each of the light transmission control regions of the light transmission control layer 153 to implement a VR and AR mixture mode.

The display unit 151 outputs a specific image 502, and the controller 180 enhances transmittance of a light transmission control region corresponding to a middle region of the display unit 151 and reduces transmittance of the other regions. Accordingly, the image is rarely seen in a first region B1 with enhanced transmittance and the external environment O is visible to the user's eyes. Since the second region B2 is opaque, an image output by the display unit 151 is clearly seen. However, since the image corresponding to the first region B1 is output by the display unit 151, in a state in which transparency is enhanced, the image may be visible in an overlapping manner with the external environment O.

The controller 180 may change the VR region and the AR region in the mixture mode on the basis of a specific control command. Here, the VR region is a region in which an image is visible in a non-light-transmissive state, and the AR region is a region in which the external environment O is visible through the display unit 151 and the light transmission control layer 153 in a state in which transmittance is increased.

The controller 180 may change a lower portion of the display unit 151 to an AR region and an upper portion of the display unit 151 to a VR region on the basis of the specific control command. Here, the user may check only an image corresponding to the upper region of the image output from the display unit 151 and recognize the external environment O in the other remaining regions.

That is, while an image is being provided in the VR mode, the user may change a partial region to be transparent to check the external environment O. Accordingly, while viewing the VR image, the user may check the external environment without having to take off the HMD 100.

FIGS. 9A to 9E are conceptual views illustrating a control method of controlling a VR mode and an AR mode according to various embodiments.

A control method of changing a control mode of a partial region on the basis of a gesture will be described with reference to FIGS. 2 and 9A. The HMD 100 according to the present disclosure includes a gesture sensor sensing gesture information. Although not shown specifically, the HMD 100 may include an illumination sensor and a pupil recognition sensor, as well as the gesture sensor.

In the AR mode, the light transmission control layer 153 is switched to a transparent state. When first gesture information g1 is detected, the controller 180 activates the gesture sensor. When second gesture information g2 is detected, the controller switches one region of the light transmission control layer 153 to a VR mode. In the VR mode, the one region is switched to an opaque region. A VR image is output to the opaque region. Here, the controller 180 may change a refractive index of the lens unit 130.

Here, the VR image 503 is seed to overlap the external environment O. The VR image 503 is output to one region of the external environment O covered by the opaque region.

Meanwhile, the controller 180 adjusts transmittance of one region corresponding to the VR mode on the basis of third gesture information g3. When the third gesture information g3 is applied, the controller 180 controls the light transmission control layer 153 such that transmittance is gradually reduced.

Meanwhile, according to the embodiment of FIG. 5, the controller 180 adjusts transmittance of the light-transmissive display unit 155 by adjusting the first and second light sources 155e and 155f included in the display unit 155.

Accordingly, since the VR image is displayed in the non-light-transmissive region (or opaque region), the external environment cannot be recognized through the opaque region and the user may recognize the VR image in a clearer state.

A control method of controlling an output of a VR image will be described with reference to FIG. 9B.

The controller 180 outputs a VR image 503 on one region in the AR and VR mixture mode using the plurality of light transmission control regions. The VR image 503 is seen to partially overlap the external environment O.

When fourth gesture information g4 is detected, the controller 180 controls magnification and reduction of the VR image. A size of a specific region in which the VR image is output is not changed on the basis of the fourth gesture information g4. In the specific region, the VR image may be magnified or reduced. That is, a magnified VR image 503a is output to overlap the external environment O.

Referring to FIGS. 9B and 9C, the magnified VR image 503a is output on a specific region. When fifth gesture information g5 is sensed, the controller 180 switches the HMD 100 to the VR mode. The controller 180 lowers transmittance of the light transmission control layer 153 (or the display unit 155) and outputs the magnified VR image 503a on the entire region of the display unit 151. Here, the user cannot detect the external environment O. Here, the fifth gesture information g5 may be a gesture covering the user's both eyes with the user's palms.

When specific control command or gesture information is detected or when a specific time has lapsed, the controller 180 may switch the VR mode to the AR mode. When the mode is switched to the AR mode, transmittance of the light transmission control layer 153 (or the display unit 155) may be increased and the external environment O may be visible. Here, the display unit 151 may stop outputting of the VR image.

An indicator indicating a VR mode may be included in an image of the VR mode, and in the AR mode, the display unit 151 may output the indicator indicating the AR mode.

According to the present embodiment, the user may output a VR image on a partial region to overlap the external environment, and in this state, the user may output the VR image as an entire screen image so as to be more minutely provided. When the mode is switched to the VR mode, a clearer VR image may be provided.

Referring to FIG. 9D, the external environment O is detected through the display unit 151 in the AR mode. When sixth gesture information g6 is detected, the controller 180 activates the VR and AR mixture mode on the basis of the sixth gesture information, and determines one region of the display unit 151 on which the VR image is to be output on the basis of the sixth gesture information g6. A specific region of the light transmission control layer 153 (or the display unit 1550 whose transmittance is to be changed is determined on the basis of the sixth gesture information g6.

The controller 180 may set one region of the display unit 151 or one region of the light transmission control layer 153 (or the display unit 155) in a region adjacent to the region in which the sixth gesture information g6 is detected, such that the VR image is output thereon.

Accordingly, the user may apply gesture information in the AR mode to activate the AR and V mixture mode and set a position in which the VR image is to be output.

Referring to FIG. 9E, the memory 170 stores a plurality of VR images. The stored VR images may be limited to mutually related images or images related to the external environment O detected by the camera unit 120. A first VR image 511 is output in the VR and AR mixture mode. The user may view the external environment O through a region in which the first VR image 511 is not output.

The controller 180 may control the display unit 151 to output at least one of the first to third VR images 511, 512, and 513 on the basis of specific gesture information. Here, at least one of the first to third VR images 511, 512, and 513 is displayed on a preset output region of the VR image.

Meanwhile, the controller 180 may additionally set a region to which the VR image is to be output, on the basis of specific gesture information. The controller 180 outputs a second VR image to the additionally set VR image output region on the basis of the specific gesture information. The controller 180 adjusts transmittance of the specific region of the light transmission control layer 153 (or the display unit 155) corresponding to the additionally set VR image output region.

In a state in which the plurality of VR images are output, the controller 180 may expand the VR image output region or switch a corresponding mode to the VR mode on the basis of additionally detected gesture information.

When the mode is switched to the VR mode, the entire region of the light transmission control layer 153 (or the display unit 155) is switched to an opaque region and the first and second VR images 511 and 512 are output to overlap the opaque region. When the mode is switched to the VR mode, the controller 180 may output the previously output VR image, output all the stored VR images, or output one magnified VR image.

FIG. 10 is a conceptual view illustrating a control method of outputting an image obtained through a camera, as a VR image.

Referring to FIG. 10, in the AR mode, the user may check the external environment). When the camera unit 120 is activated or when a specific control command is applied, the controller 180 activates the camera unit 120. The camera unit 120 may distinguishably obtain a plurality of contents C1, C2, and C3 included in the external environment O. The controller 180 may classify the contents obtained by the camera 120 into text, an image, video, and the like. When at least a portion of the external environment O is imaged by the camera 120, the controller 180 controls the display unit 151 to output screen information 520 for storing and outputting the imaged portion.

The screen information 520 may be output after the mode is switched to the VR mode, but the present disclosure is not limited thereto and the screen information 520 may be output to overlap the external environment O in the AR mode.

When content to be stored and output, such as an image, text, and the like, is selected on the basis of the screen information 520, the controller 180 switches the mode to the VR and AR mixture mode and outputs stored contents information 521. One region of the light transmission control layer 153 (or the display unit 155) is switched to an opaque region and the content information 521 is output as a VR image to the opaque region.

Accordingly, the user, while being provided with the stored content in one region, may recognize the external environment O though the other regions.

FIGS. 11A to 11C are conceptual views illustrating a control method of changing an output mode of an output image.

Referring to FIG. 11, the display unit 151 outputs an AR image in the AR mode. The display unit 151 outputs first to third AR images i1, I2, and I3, and the first to third images I1, I2, and I3 are output to overlap the external environment O. In the AR mode, transmittance of the light transmission control layer 153 (or the display unit 155) is enhanced.

The controller 180 switches the AR mode to the AR and VR mixture mode to output a VR image to one region on the basis of a specific control command in the AR mode. For example, in cases where a palm is positioned to overlap the third AR image I3, the controller 180 may switch the AR image I3 to a VR image 531. When the third AR image I3 is positioned on the palm, the controller 180 may lower transmittance of one region of the light transmission control layer 153 (or the display unit 155) corresponding to the region on which the third AR image I3 is output and switches to the opaque state. Also, the controller 180 controls the lens unit 130 to implement a convex les, and in order to prevent distortion by the convex lens, the controller 180 controls the display unit 151 (or the display unit 155) to output a VR image 531 deformed from the third AR image I3.

When the third AR image I3 is switched to the VR image 531, an opaque region in which one region of the palm is not visible is formed.

Meanwhile, the controller 180 changes an output region of the VR image 531 on the basis of a specific control command. The specific control command is formed when a palm positioned to overlap the VR image 531 is detected. The controller 180 detects a position of the palm by the camera 120 and changes a position in which the VR image 531 is output on the basis of the change in position.

That is, on the basis of the position in accordance with the specific control command, the controller 180 controls the display unit 151 to change a region in which the VR image 531 is output and controls the light transmission control layer 153 (or the display unit 155) to change transparency. Upon detecting movement of the palm in real time, the controller 180 changes an output position of the VR image and increases again transparency of a region on which the VR image is not output.

Thus, the AR image, which is covered by the palm and desired to be viewed by the user more accurately may be changed into the VR image and clearly provided.

Referring to FIG. 11B, the controller 180 changes the third AR image I3 overlapping the palm sensed by the camera into an AR image 351. Since a specific first time t1 has lapsed since the palm was detected, the controller 180 enhances transparency of the region in which the VR image 351 is displayed. Or, when a specific second time t2 has lapsed, the controller switches to output the VR image 351 even though the palm is not detected.

Referring to FIGS. 11A and 11C, when the palm in a position overlapping the third AR image I3 is detected by the camera unit 120, the controller 180 switches the third AR image I3 to the VR image 531.

Also, when the palm is positioned in a central region of the display unit 151 or when the palm detected by the camera unit 120 is detected to be greater than a specific size (that is, when the palm is disposed to be adjacent to the HMD 100), the controller 180 controls the display unit 151 to output an expanded VR image 532. The controller 180 controls the light transmission control layer 153 (or the display unit 155) to reduce transparency of the region in which the expanded VR image 532 is output.

Accordingly, the user may be provided with the magnified VR image desired to be viewed.

FIGS. 12A and 12B are conceptual views illustrating a control method of outputting a VR image to a position set by an external environment.

Referring To FIG. 12A, in the AR mode, the light transmission control layer 153 (or the display unit 155) increases transmittance. Accordingly, the user may detect the external environment O.

The controller 180 forms a VR image on the basis of related information stored in the memory 170. Here, the related information corresponds to information related to at least one content included in an image of an external environment obtained by the camera unit 120, among pieces of information stored in the memory 170.

For example, in cases where destination information is stored in the memory 170 and an image indicating a current location is obtained by the camera unit 120, the controller 180 forms a VR image 541 on the basis of the destination information. For example, the VR image 541 includes information regarding the number of stops to go to reach a destination.

The VR image 541 is output on a position overlapping at least one content. Thus, the at least one content is covered by the VR image 541. Although not shown specifically, when the user's head moves, the position in which the VR image 541 is output is also changed. Also, in cases where the at least one content is not sensed by the camera unit 120, outputting the VR image 541 may be stopped.

Accordingly, related information required for the user may be applied to an external environment so as to be provided.

Referring to FIG. 12B, the controller 180 provides different VR images on the basis of stored personal information of the user. When specific contents are collected by the camera unit 120, the controller 180 forms different first and second VR images 551 and 552 on the basis of the specific content and the personal information.

The HMD 100 of a user A controls the display unit 151 to output the first VR image 551 to overlap the content, and the HMD 100 of a user B controls the display unit 151 to output the second VR image 552 to overlap the content.

Sizes of the first and second VR images 551 and 552 may be set on the basis of a size of the specific content and a distance to the specific content.

According to the present embodiment, information customized for a user may be provided.

INDUSTRIAL APPLICABILITY

The present invention relates to an HMD and provides a control method for switching between the VR mode and the AR mode. Thus, the present disclosure may be utilized in various related industrial fields.

The invention claimed is:

1. A head-mounted display (HMD) comprising:
a frame configured to be fixated to a head;
a light-transmissive display unit fixated to the frame and outputting a VR image in a VR mode and an AR image in an AR mode;
a light transmission control layer disposed on the display unit and including polymer-dispersed liquid crystal changing a transmittance of light by an applied voltage;
a lens unit including a first liquid allowing a current to transmit therethrough and a second liquid not allowing a current to transmit therethrough and having a refractive index changed in the VR mode and the AR mode; and
a controller configured to control the light transmission control layer to increase transmittance in the AR mode and decrease transmittance in the VR mode,
wherein a voltage is applied to the light transmission control layer in the AR mode and a voltage is not applied to the light transmission control layer in the VR mode, and
wherein a voltage is not applied to the lens unit in the AR mode and a voltage is applied to the lens unit in the VR mode, and a thickness of the second liquid is changed by an applied current to change the refractive index of the lens unit.

2. The HMD of claim 1, wherein
the controller applies a current to the lens unit in the VR mode to increase the thickness of the second liquid and change a focal length of the VR image.

3. The HMD of claim 2, wherein
the display unit outputs a distorted VR image with refracted edges.

4. The HMD of claim 1, wherein
the light transmission control layer is implemented by first and second light sources, first and second light guide plates, and a pair of polarizing plates included in the display unit,
the first light source outputs light to the first light guide plate, the second light source outputs light to the second light guide plate, and
the first and second light guide plates have recess patterns formed on surfaces thereof facing each other.

5. The HMD of claim 4, wherein
the first light guide plate is disposed to be adjacent to a display panel outputting visual information, and
the controller turns off the second light source in the VR mode and turns on the second light source in the AR mode.

6. The HMD of claim 1, wherein
the light transmission control layer is divided into a plurality of light transmission control regions, and
the controller independently controls transmittance of the plurality of light transmission control regions.

7. The HMD of claim 6, wherein
the controller enhances transmittance of a first region to allow an external environment to be recognized through the first region and reduces transmittance of a second region in a VR and AR mixture mode.

8. The HMD of claim 7, wherein
the display unit outputs a VR image on the second region.

9. The HMD of claim 7, further comprising:
a sensing unit sensing gesture information in the VR and AR mixture mode,
wherein the controller adjusts transmittance on the basis of the gesture information.

10. The HMD of claim 7, wherein
the controller controls the display unit to magnify a VR image output on the first region on the basis of the gesture information.

11. The HMD of claim 7, wherein
the controller switches the VR and AR mixture mode to the VR mode on the basis of the gesture information and controls the display unit to entirely output a VR image displayed on the first region.

12. The HMD of claim 7, wherein
the first and second regions are set according to a position in which a specific gesture information is sensed.

13. The HMD of claim 7, further comprising:
a camera imaging an external environment,
wherein the controller controls the light-transmissive display unit to output at least a portion of an image captured by the camera, as a VR image on the second region.

14. The HMD of claim 7, wherein
the display unit outputs an AR image in the AR mode,
the controller controls, when gesture information is sensed in a position overlapping the AR image, the light transmission control layer to reduce transmittance of a region on which the AR image is output, and
the display unit outputs the AR image as a VR image.

15. The HMD of claim 7, further comprising:
a camera imaging the external environment; and
a memory storing information,
wherein the controller forms a VR image on the basis of a captured image and the stored information, and
the display unit outputs the VR image to a position overlapping the external environment.

16. The HMD of claim 15, wherein
when the external environment is changed, an output position and a shape of the VR image are changed.

* * * * *